(12) United States Patent
Ogino et al.

(10) Patent No.: US 9,748,805 B2
(45) Date of Patent: Aug. 29, 2017

(54) GENERATOR

(71) Applicants: Sanshiro Ogino, Tokyo (JP); T. K LEVERAGE CO., LTD., Tokyo (JP)

(72) Inventors: Sanshiro Ogino, Tokyo (JP); Takaitsu Kobayashi, Chiba (JP)

(73) Assignees: Sanshiro Ogino (JP); T.K Leverage Co., Ltd. (JP)

( * ) Notice: Subject to any disclaimer, the term of this patent is extended or adjusted under 35 U.S.C. 154(b) by 632 days.

(21) Appl. No.: 14/365,525

(22) PCT Filed: Dec. 14, 2012

(86) PCT No.: PCT/JP2012/082566
§ 371 (c)(1),
(2) Date: Sep. 12, 2014

(87) PCT Pub. No.: WO2013/089248
PCT Pub. Date: Jun. 20, 2013

(65) Prior Publication Data
US 2015/0200573 A1  Jul. 16, 2015

(30) Foreign Application Priority Data

Dec. 16, 2011 (JP) ................................ 2011-275628

(51) Int. Cl.
*H02K 21/22* (2006.01)
*H02K 37/00* (2006.01)
(Continued)

(52) U.S. Cl.
CPC .......... *H02K 1/2733* (2013.01); *H02K 21/00* (2013.01); *H02K 21/028* (2013.01); *H02K 21/44* (2013.01); *H02K 29/03* (2013.01)

(58) Field of Classification Search
CPC ................................ H02K 21/44; H02K 1/278
(Continued)

(56) References Cited

U.S. PATENT DOCUMENTS 4,920,294 A  4/1990 Christiaens et al.
6,882,066 B2  4/2005 Kastinger
(Continued)

FOREIGN PATENT DOCUMENTS

CN  1615572 A  5/2005
CN  2706952 Y  6/2005
(Continued)

OTHER PUBLICATIONS

Chinese Office Action (with English Translation) for Chinese Application No. 201280068570.3 dated Dec. 29, 2015 (11 pages).
(Continued)

*Primary Examiner* — Jose Gonzalez Quinones
(74) *Attorney, Agent, or Firm* — Harness, Dickey & Pierce, P.L.C.

(57) ABSTRACT

The purpose of the present invention is to provide a electric generator which has a simple structure while sufficiently suppressing cogging torque. A electric generator is constituted by a rotor section comprising a plurality of protrusions which is arranged linearly with constant pitch at mutually separated positions sandwiching permanent magnets, and a stator section which has a stator member comprising stator yokes, permanent magnets facing the permanent magnets, and protrusions which protrude closer to the rotor section than the permanent magnets and are arranged linearly with constant pitch at mutually separated positions sandwiching the permanent magnets, the stator member being configured such that the protrusions and the protrusions are shifted from each other by a half pitch between adjoining stator members. Further, the rotor section-side protrusions may be shifted by a half pitch instead of the stator section-side protrusions.

10 Claims, 15 Drawing Sheets

(51) Int. Cl.
*H02K 21/12* (2006.01)
*H02K 21/00* (2006.01)
*H02K 1/06* (2006.01)
*H02K 1/27* (2006.01)
*H02K 21/02* (2006.01)
*H02K 29/03* (2006.01)
*H02K 21/44* (2006.01)

(58) Field of Classification Search
USPC ... 310/49.32, 49.53, 154.02, 154.05, 154.08, 310/154.13, 154.44, 154.48, 216.021, 310/216.023, 216.025, 216.028, 216.031, 310/216.104, 192
See application file for complete search history.

(56) References Cited

U.S. PATENT DOCUMENTS

| | | | |
|---|---|---|---|
| 7,057,323 | B2 | 6/2006 | Horst |
| 7,088,029 | B2 | 8/2006 | Hiramatsu |
| 7,365,472 | B2 | 4/2008 | Hiramatsu |
| 2002/0175580 | A1* | 11/2002 | Ogino ............... H01F 7/06 310/152 |
| 2006/0006744 | A1* | 1/2006 | Nashiki ............. H02K 1/145 310/49.37 |
| 2011/0070108 | A1 | 3/2011 | Arita et al. |

FOREIGN PATENT DOCUMENTS

| | | | |
|---|---|---|---|
| JP | 1986-052488 U | | 4/1986 |
| JP | H08-214519 A | | 8/1996 |
| JP | 09131040 A | * | 5/1997 |
| JP | 2002-191160 A | | 7/2002 |
| JP | 2002-247818 A | | 8/2002 |
| JP | 2006-025559 A | | 1/2006 |
| JP | 2006-101695 A | | 4/2006 |
| JP | 2009-033930 A | | 2/2009 |
| TW | 2012-30615 A | | 7/2012 |
| WO | WO-2009-136574 A1 | | 11/2009 |

OTHER PUBLICATIONS

Taiwan Office Action for Application No. TW 102116512 dated Jun. 15, 2017 with English abstract (5 pages).

* cited by examiner

GENERATOR

CROSS-REFERENCE TO RELATED APPLICATIONS

This application is a U.S. National Stage Application of International Application No. PCT/JP2012/082566 filed on Dec. 14, 2012, and published in Japanese as WO 2013/089248 A1 on Jun. 20, 2013. This application claims priority to Japanese Application No. 2011-275628 filed on Dec. 16, 2011. The entire disclosures of the above applications are incorporated herein by reference.

TECHNICAL FIELD

This invention relates to an electric generator.

BACKGROUND ART

An electric generator comprising a rotor having a magnet such as a permanent magnet and a stator having a coil may be improved in power generation efficiency as the number of turns of the coil is large. However, increasing of the number of turns of the coil enlarges size of the electrostatic generator.

On the other hand, JP 2006-340425 A, for example, discloses a motor reduced in size and improved in output by arranging the magnet of the rotor side and the coil of the stator side in a predetermined positional relationship. Therefore, it is considered to obtain an electric generator with high power generation efficiency by adopting the positional relationship between the magnet and coil of such a motor.

Further, in the electric generator as described above, it is known that when the rotor rotates cogging torque is generated in relation to the core. Such cogging torque is caused by attractive force or repulsive force generated between the magnetic poles of the rotor and the core and would cause cogging on rotation of the rotor. Therefore, the rotation of the rotor becomes unstable by the cogging torque. Regarding such a point, JP 2006-101695 A, for example, discloses a mean for suppressing cogging by making the shape of the part for mounting the magnet of the rotor into a predetermined shape to moderate the change in magnetic flux at the rotor rotating.

SUMMARY OF INVENTION

Technical Problem

However, the conventional technologies described above have problems that the structures are complicated and cannot suppress cogging sufficiently.

Accordingly, this invention aims to provide a power electric generator which has not a complex structure and achieves sufficient suppression of cogging.

Solution to Problem

An electric generator according to this invention comprises a rotor portion and a stator portion in which: the rotor portion includes: a rotor yoke which made of soft magnetic material and which has a cylindrical non-magnetic portion and one or more pairs of grooves towards the non-magnetic portion; annular rotor side permanent magnets each of which is arranged in each of the grooves and magnetized as north and south poles in an axial direction; and a plurality of rotor side protrusions which protrude over the rotor side permanent magnet to the stator portion side and are arranged linearly with a constant pitch at mutually separated positions sandwiching the rotor side permanent magnets; the stator portion includes a stator member made of soft magnetic material having: a stator yoke; annular stator side permanent magnets being opposed to the rotor side permanent magnets; and stator side protrusions arranged linearly with the constant pitch at mutually separated positions sandwiching the stator side permanent magnets; wherein the stator members are arranged to shift the stator side protrusions by a half of the pitch between the neighboring stator members.

It is preferable for the electric generator according to this invention that non-magnetic portions a number of which is equal to the multiple of two are provided instead of the non-magnetic portion wherein each of the non-magnetic portions extends in axial direction to connect between neighboring ones of the rotor side permanent magnets and has a length longer than the axial distance between the both end faces of the corresponding both rotor side permanent magnets.

According to another aspect of this invention, an electric generator comprises a rotor portion and a stator portion in which: the rotor portion includes: a rotor yoke which made of soft magnetic material and which has a cylindrical non-magnetic portion and one or more pairs of grooves towards the non-magnetic portion; annular rotor side permanent magnets each of which is arranged in each of the grooves and magnetized as north and south poles in an axial direction; and a plurality of rotor side protrusions which protrude over the rotor side permanent magnet to the stator portion side and are arranged at mutually separated positions sandwiching the rotor side permanent magnets; wherein one of the rotor side protrusions located between two of the rotor side permanent magnets is shift by a half of the pitch at the position where the length of the one of the rotor side protrusions in the axial direction is equally divided by two; and in which: the stator portion includes a stator member made of soft magnetic material having: a stator yoke; annular stator side permanent magnets being opposed to the rotor side permanent magnets; and stator side protrusions arranged linearly with the constant pitch at mutually separated positions sandwiching the stator side permanent magnets.

It is also preferable for the electric generator according to the another aspect of this invention that non-magnetic portions a number of which is equal to the multiple of two are provided instead of the non-magnetic portion wherein each of the non-magnetic portions extends in axial direction to connect between neighboring ones of the rotor side permanent magnets and has a length longer than the axial distance between the both end faces of the corresponding both rotor side permanent magnets.

In these configurations, it is preferable that areas of the opposing parts of the rotor protrusions and the stator side protrusions and non-opposing part thereof are set constant respectively regardless of the positional relationship between the rotor portion and the stator portion in the rotation direction.

According to further aspect of this invention, non-magnetic portions are provided instead of the stator side permanent magnets.

DESCRIPTION OF EMBODIMENTS

Preferred embodiments of the present invention will now be described with reference to the drawings. In the following description, the term "flux" means a flux of magnetic field lines and the term "magnetic path" means a path of the magnetic field lines. Further, notation of "a magnetic path is formed by the magnetic flux" may be read as "a magnetic path is formed by the magnetic field lines."

Figure 1:
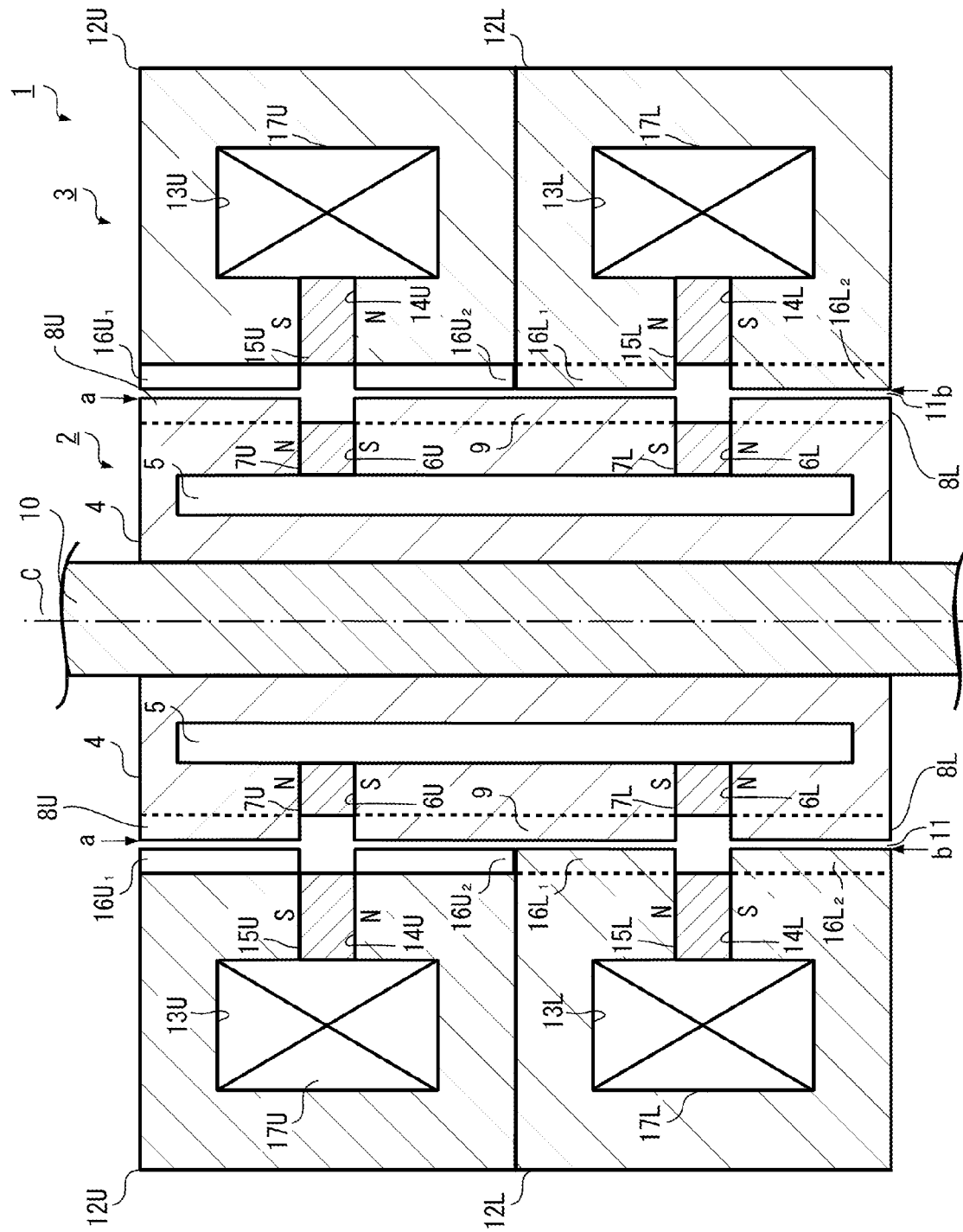
FIG. 1 shows main parts of a preferred embodiment according to this invention by a cross section along the central axe of a rotor portion.
Figure 2:
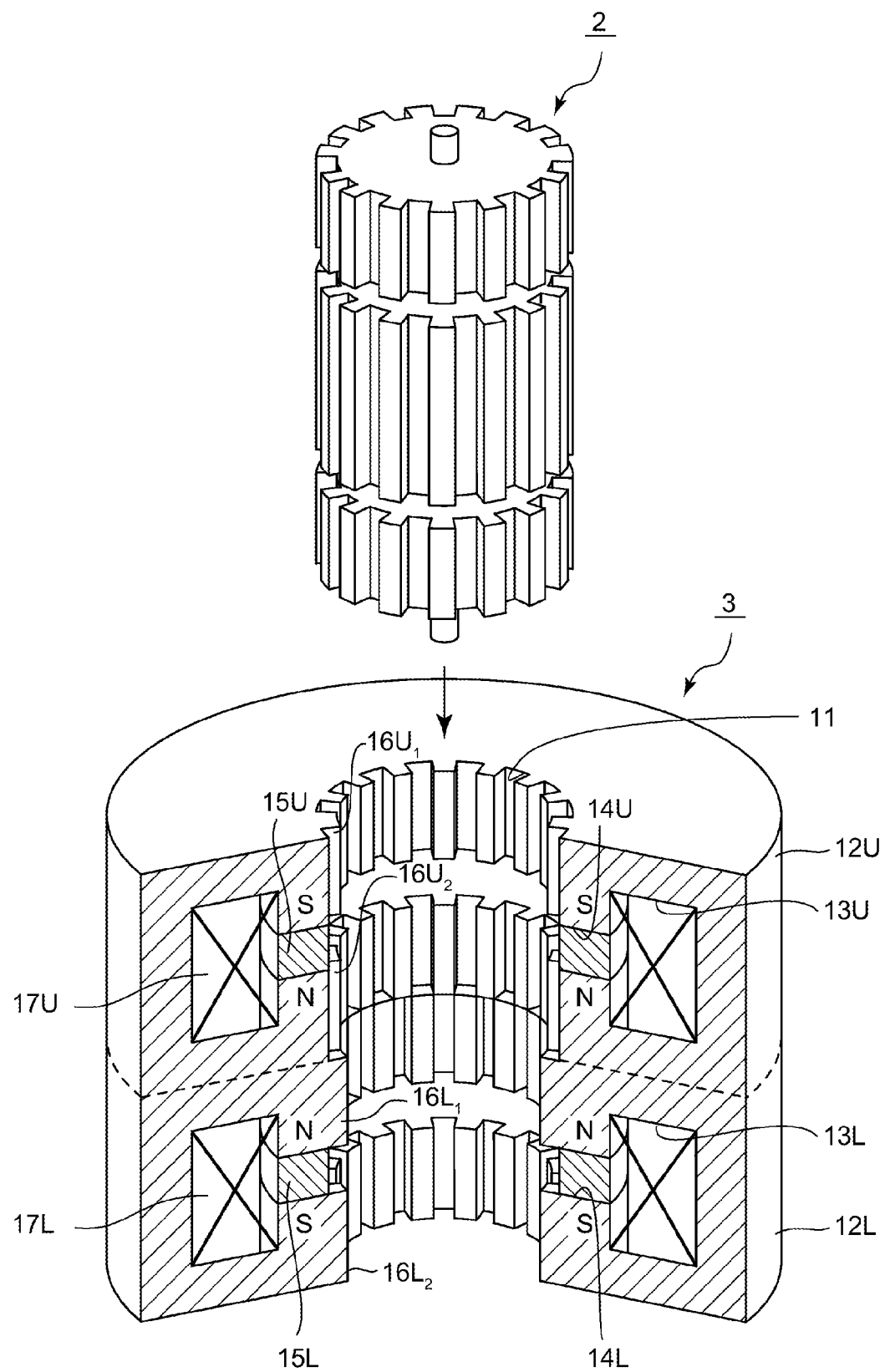
FIG. 2 shows a perspective view of an arrangement of the electric generator shown in FIG. 1 with cutting out partly in conjunction with the rotor and the inserting direction thereof.
Figure 3:
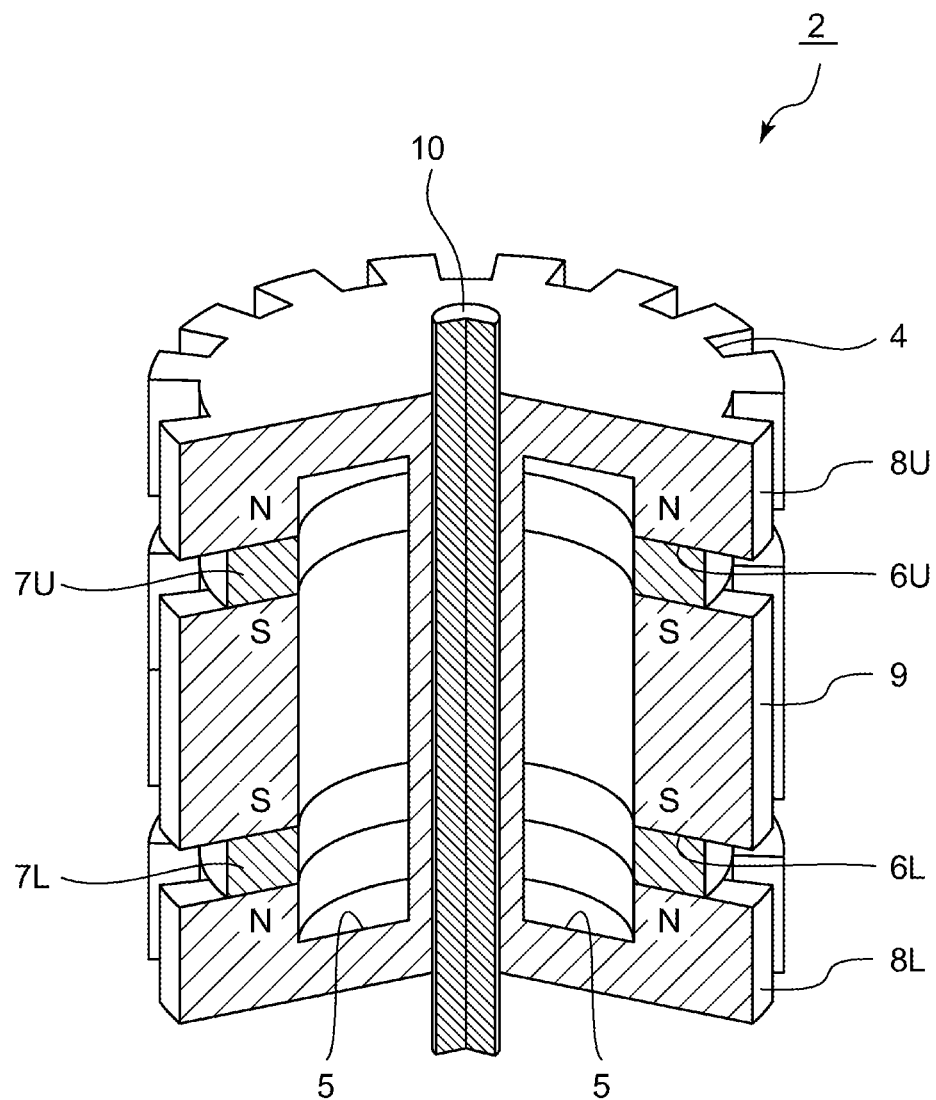
FIG. 3 shows a perspective view of the rotor portion of the electric generator shown in FIG. 1 with cutting out partly.

As shown in FIGS. 1 to 3, an electric generator 1 according to an embodiment of the present invention comprises a rotor portion 2 and a stator portion 3. The rotor portion 2 comprises a rotor yoke 4 made of a soft magnetic material of a cylindrical shape. In the rotor yoke 4, there are provided a cylindrical hollow portion 5 having a square cross-section hollow and two grooves 6U and 6L penetrating from an outer periphery "a" of the rotor yoke 4 to a non-magnetic portion of the hollow portion 5 in the circumferential direction. An annular permanent magnet 7U is provided so as to be sandwiched between the wall surfaces of the groove 6U and an annular permanent magnet 7L is provided also so as to be sandwiched between the wall surfaces of the groove 6L.

The rotor yoke 4 has a plurality of rectangular-shaped protrusions 8U made of magnetic material at the axially upward side of the permanent magnet 7U shown in FIGS. 1-3, a plurality of rectangular-shaped protrusions 8L made of magnetic material at the axially downward side of the permanent magnet 7L shown in FIGS. 1-3, and a plurality of rectangular-shaped protrusions 9 made of magnetic material between the permanent magnet 7U and 7L. Respective outer surfaces of the protrusions 8U, 9 and 8L are arranged so as to form equally-spaced angular intervals respectively about the center axis C of the rotor yoke 4 and so as to be linearly arranged in the axial direction.

The outer periphery "a" has an arc-shaped cross section for each of the protrusions 8U, 9 and 8L. Supposing the length of a part of the outer periphery "a" for one protrusion being L, the span of a virtual outer periphery "a" with the neighboring protrusion 8U, 9 or 8L is set as L. At the center of the rotor yoke 4, a rotation shaft 10 is provided. The portion the rotation shaft 10 contacts with the rotation shaft 10 is joined so that the rotor yoke 4 can rotate integrally in accordance with the rotation shaft 10 rotating.

In a housing of the electric generator 1, which is not show in FIGS. 1-3, the rotor portion 2 and the stator portion 3 are accommodated such that slight gaps are maintained between the protrusions 8U, 9 and 8L of the rotor portion 2 and respective protrusions $16U_1$, $16U_2$, $16L_1$ and $16L_2$ of the stator unit 3 described below. On the outside of the housing, the rotation shaft 10 is extending directly, or indirectly through a gear train or else so that the rotor portion 2 can rotate together with the rotation shaft 10 at the inside of the stator portion 3 when a rotation torque is applied on the rotation shaft 10 from outside. The protrusions 8U, 9 and 8L may be manufactured by integral molding together with the main body of the rotor yoke 4. The protrusions $16U_1$, $16U_2$, $16L_1$ and $16L_2$ described below may be also manufactured by integral molding together with stator yokes 12U and 12L.

In the example shown in FIGS. 1-3, the rotor part 2 is configured as the upper end face of the upper-side permanent magnet 7U takes the north pole, the lower end face of the same takes the south pole, the upper end face of the lower-side permanent magnet 7L takes the south pole, and the lower end face of the same takes the north pole. That is, the annular permanent magnets 7U and 7L are magnetized in the axial direction together and are arranged such that the opposing faces of the permanent magnets 7U and 7L have the same polarity.

On the rotor portion 2 itself, the magnetic flux of the upper-side permanent magnet 7U is to pass from the lower end of the projecting portions 8U through the outside of the rotor part 2, direct to the upper end of the protrusions 9 shown in FIG. 1, and return to the south pole. At the same time, the magnetic flux of the lower-side permanent magnet 7L is to pass from the upper end of the protrusions 8L through the outside of rotor portion 2, direct to the lower end of the protrusions 9 shown in FIG. 1, and return to the south pole.

In the rotor portion 2 according to the preferred embodiment of the present invention having such a configuration, magnetic flux always directs from the protrusions 8U, 9 and 9L to themselves. By forming such protrusions 8U, 9 and 8L, it is possible to increase the density of the magnetic flux to increase the attractive force.

The stator portion 3 has a double decker construction of stator yokes 12U and 12L being piled in the axial direction, wherein the stator yokes 12U and 12L are made of a soft magnetic material in a cylindrical shape with a cylindrical hole portion 11 in the center for inserting the rotor portion 2. In this description, it is explained, for the purpose of illustration, that the stator yokes 12U and 12L are constructed as the "double decker construction." Practically, these may be constructed from one yoke member to form one part corresponding to the stator yoke 12U and another part corresponding to the stator yoke 12L. Two stator yokes 12U and 12L may be formed separately and joined in double decker.

In the stator yoke 12U and 12L of the stator portion 3, there are provided annular hollow portions 13U and 13L each having a square cross-section, and annular grooves 14U and 14L penetrating from the inner periphery (facing to the hole portion 11) of the stator yoke 12U and 12L to the hollow portions 13U and 13L. An annular permanent magnet 15U is attached on the groove 14U of the stator yoke 12U and an annular permanent magnet 15L is attached on the groove 14L of the stator yoke 12L. Protrusions $16U_1$, $16U_2$, $16L_1$ and $16L_2$ made f magnetic material arranged in two stages by two longitudinally are provided on the hole portion 11 or the inner-side surface of the stator yoke 12U and 12L so as to sandwich the permanent magnet 15U and 15L in the axial direction. The inner periphery "b" of the protrusions $6U_1$, $16U_2$, $16L_1$ and $16L_2$ are configured so as to be opposed to the outer periphery "a" of the rotor yoke 4 and each part of the inner periphery "b" for the protrusions $6U_1$, $16U_2$, $16L_1$ and $16L_2$ is slightly longer than the length L of the outer periphery "a" in the circumferential direction.

Protrusions $16U_1$ and $16U_2$ of the stator yoke 12U and protrusions $16L_1$ and $16L_2$ of the stator yoke 12L are arranged so as to shift by a half pitch each other in the circumferential direction with respect to the central axis of the stator yokes 12U and 12L. The protrusions $16U_1$, $16U_2$, $16L_1$ and $16L_2$ are also arranged so as to form equally-spaced angular intervals along the inner-side face of the stator yokes 12U and 12L in the circumferential direction about the center axis of the stator yokes 12U and 12L and be spaced in the same length with the width of each inner periphery "b" of the protrusions $16U_1$, $16U_2$, $16L_1$ and $16L_2$. In the hollow portions 13U and 13L, there are provided wound portions 17U and 17L respectively. The wound portion 17U has a wound in the circumferential direction multiply and both ends of the wire (not shown) are drawn from the stator yoke 12U to the outsid. The wound portion 17L similarly has a wound and both ends of the wire (not shown) are drawn from the stator yoke 12L to the outside. Each of the wires leads electric current generated by the electric generator 1 to the outside.

In the example shown in FIGS. 1 and 2, it is configured that the upper end face of the permanent magnet 15U of the stator yoke 12U takes a south pole and the lower end face of the same takes a north pole. If the stator yoke 12U is in a condition that the rotor portion 2 is not inserted in the hole 11, a magnetic path is generally formed on the stator yoke 12U starting from the north pole of the lower end face of the permanent magnet 15U, passing the inner periphery and the inside of the stator yoke 12U, directing to the lower side of the stator yoke 12U, turning in the vicinity of the boundary between the stator yoke 12U and the stator yoke 12L, directing from the center of the stator yoke 12U to the outside, turning at a point of the outer periphery side, directing along the outer periphery and through the inside of the upper end to the inside in the radial direction, turning at a point of the inner periphery side to downward again, and returning to the south pole of the permanent magnet 15U (not shown in the drawings). In addition to this magnetic path, a portion of the magnetic flux forms a magnetic path of directing from the stator yoke 12U near the north pole of the permanent magnet 15U to the hole 11 side and returning to the stator yoke 12U near the south pole of the permanent magnets 15U.

At the same time, in the example shown in FIGS. 1 and 2, it is configured that the lower end face of the permanent magnet 15L of the stator yoke 12L takes a south pole and the upper end face of the same takes a north pole. If the stator yoke 12L is in a condition that the rotor portion 2 is not inserted in the hole 11, a magnetic path is generally formed on the stator yoke 12L starting from the north pole of the upper end face of the permanent magnet 15L, passing the inner periphery and the inside of the stator yoke 12L, directing to the upper side of the stator yoke 12L, turning in the vicinity of the boundary between the stator yoke 12L and the stator yoke 12U, directing from the center of the stator yoke 12L to the outside, turning at a point of the outer periphery side, directing along the outer periphery and through the inside of the lower end to the inside in the radial direction, turning at a point of the inner periphery side to upward again, and returning to the south pole of the permanent magnet 15L (not shown in the drawings). In addition to this magnetic path, a portion of the magnetic flux forms a magnetic path of directing from the stator yoke 12L near the north pole of the permanent magnet 15L to the hole 11 side and returning to the stator yoke 12L near the south pole of the permanent magnets 15L.

The protrusions $16U_1$ and $16U_2$ of the stator portion 3 shown in FIG. 1 are not opposed to the protrusions 8U and 9 of the rotor portion 2. On the other hand, the protrusions $16L_1$ and $16L_2$ of the stator unit 3 shown in FIG. 1 IG 1 1, 16L 2 are opposed to the protrusions 9 and 8L of the rotor portion 2. In this electric generator 1 in this way, the protrusions 8U, 9 and 8L of the rotor yoke 2 take a condition that there is no portion being opposed to the protrusions $16U_1$ and $16U_2$ of the stator yoke 12U when being opposed to the protrusions $16L_1$ and $16L_2$ of the stator yoke 12L entirely.

Figure 4:
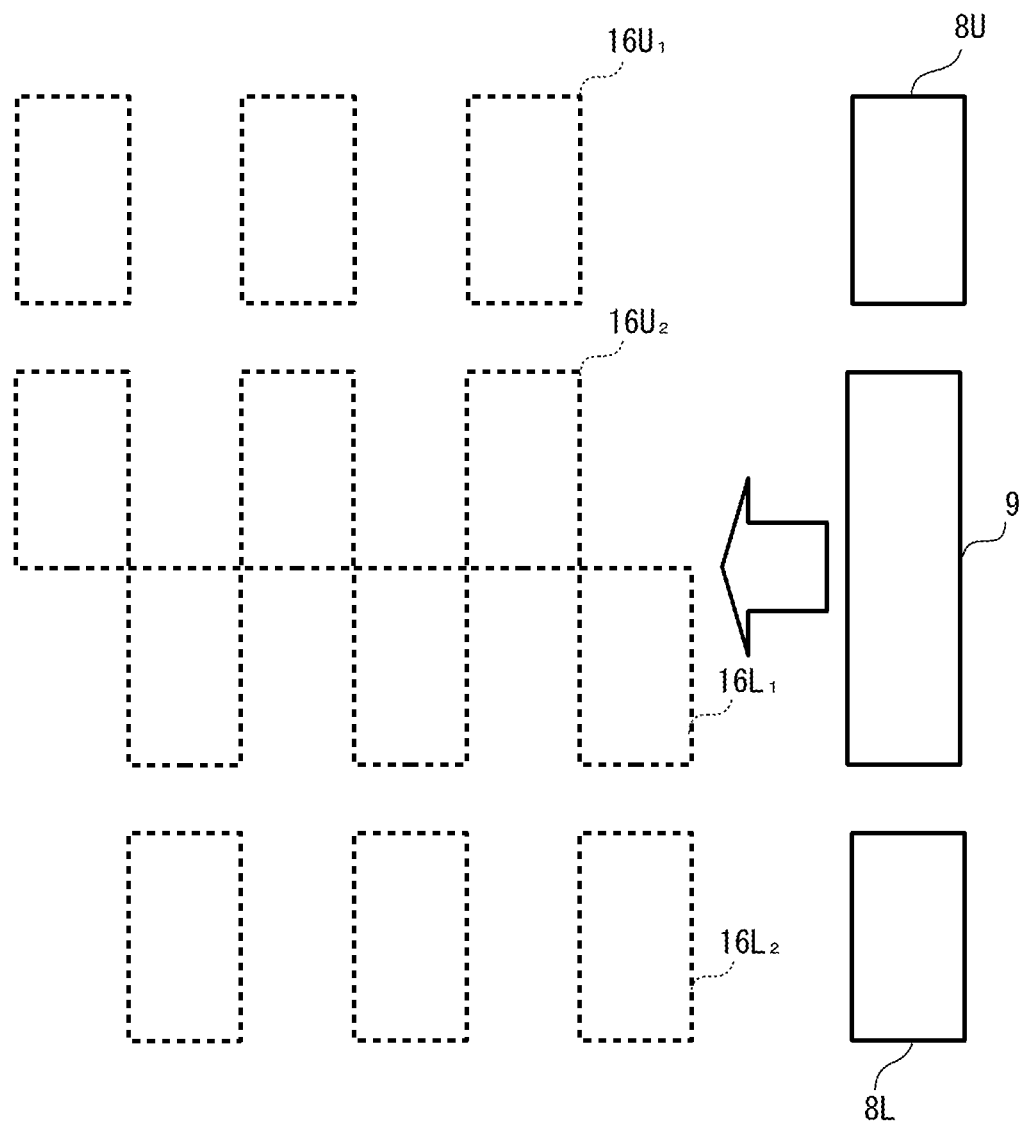
FIG. 4 shows a positional relationship in a circumferential direction (a rotation direction) between rotor side protrusions (solid lines) of the rotor portion shown in FIG. 1 and stator side protrusions (dashed lines) of the stator portion shown in FIG. 2.

In the electric generator 1, as shown in FIG. 4, the protrusions 8U, 9 and 8L of the rotor portion 2 pass across the protrusions $16U_1$, $16U_2$, $16L_1$ and $16L_2$ of the stator portion 3 in the circumferential direction in accordance with the rotor yoke 4 of the rotor portion 2 rotating along with rotation of the rotation shaft 10. It causes a change of the magnetic flex and this change induces an electric current on each of the wound portions 17U and 17L to generate electricity. The electric generator 1 may be used for storing of electricity and/or driving a load by extracting the electric current flowing in the wound portions 17U and 17L.

Figure 5:
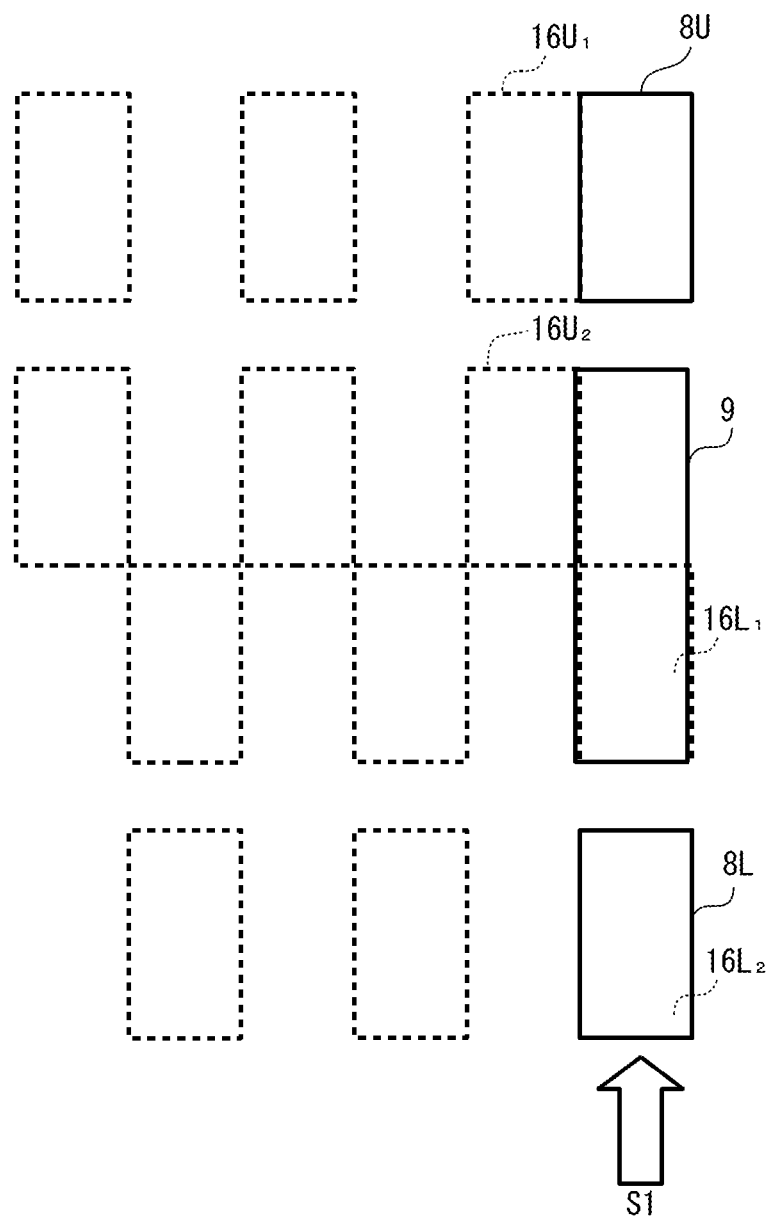
FIG. 5 shows a predetermined positional relationship S1 between the rotor side protrusions (solid lines) of the rotor portion shown in FIG. 1 and the stator side protrusions (dashed lines) of the stator portion shown in FIG. 2.

As shown in FIG. 5, for example, a state S1 is defined as the protrusions $16U_1$ and $16U_2$ of the stator unit 3 are not opposed to any of the protrusions 8U, 9 and 8L, a lower half of the protrusion 9 of the rotor portion 2 is opposed to the protrusion $16L_1$ of the stator portion 3, and the protrusion 8L of the rotor 2 is opposed to the protrusion $16L_2$ of the stator portion 3.

Figure 6:
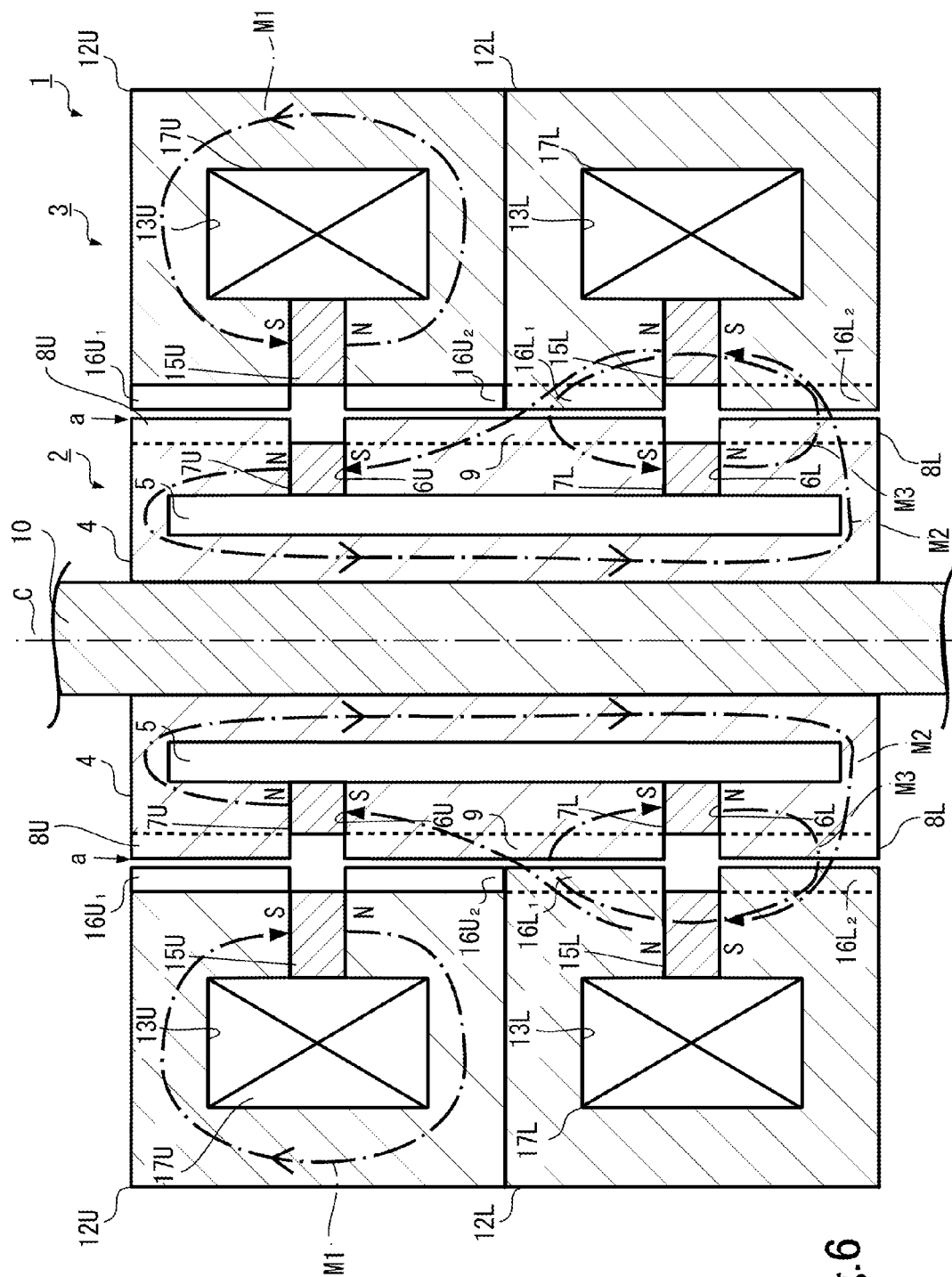
FIG. 6 schematically shows a state of magnetic paths in the electric generator in the state S1 of the predetermined relationship shown in FIG. 5.

In such a state S1, since the stator yoke 12U of the stator portion 3 is not affected so much by the attractive force from the protrusions 8U and 9 of the rotor portion 2, most of the magnetic flux from the permanent magnet 15U of the stator yoke 12U forms, as shown in FIG. 6, a magnetic path M1 (shown by dashed-dotted lines) starting from the north pole of the permanent magnet 15U, passing around the hollow portion 13U and returning to the south pole of the permanent magnet 15U. At this time, most of the magnetic flux of the permanent magnet 7U of the rotor portion 2 is made direct to the south pole side of the stator yoke 12L because of strong affection of the protrusions $16L_1$ and $16L_2$ of the stator yoke 12L which have the inner periphery "b" of the stator portion 3 being closer to the outer periphery "a" of the stator portion 3 than the protrusions $16U_1$ and $16U_2$ of the stator yoke 12U. Since the inner periphery "b" of the protrusions $16L_1$ and $16L_2$ of the stator portion 3 comes very close to the outer periphery "a" of the protrusions 9 and 8L of the rotor portion 2, most of the magnetic flux of the permanent magnet 7L of the rotor portion 2 directs from the protrusions 9 and 8L of the rotor portion 2 into the stator yoke 12L side while most of the magnetic flux of the permanent magnet 15L of the stator portion 3 directs to the rotor portion 2.

Consequently, as shown in FIG. 6, in the rotor portion side, a magnetic path M2 is formed starting from the north pole of the upper end face of the permanent magnet 7U, passing around the vicinity of the upper end face of the rotor yoke 4, once entering into the stator yoke 12L side at the vicinity of the lower end face of the rotor yoke 4, entering into the rotor part 2 side again at the vicinity of the upper end face of the stator yoke 12, and returning to the south pole of the lower end face of the permanent magnet 7U. A magnetic path M3 is also formed such that most of the magnetic flux of the permanent magnet 15L of the stator yoke 12L of the stator portion 3 directs to the protrusion 9 of the rotor portion 2 while most of the magnetic flux of the permanent magnet 7L of the rotor portion 2 directs to the protrusion $16L_2$ of the stator portion 3. As is formed the magnetic path M2, the magnetic flux of the permanent magnet 7U of the rotor portion affect the stator portion 3 little and it makes the magnetic path M3 between the permanent magnet 7L of the rotor portion 2 and the permanent magnet 15L of the stator portion 3 more efficient.

In the state S1 as described above, changes are happened on the wound portions 17U and 17L such that most of the magnetic flux of the permanent magnet 15L having passed around the wound portion 17L until just before the state S1 is absorbed into the rotor portion 2 side to become weak and that the magnetic flux of the permanent magnet 15U having directed to the rotor portion 2 side until just before the state S1 returns to the wound portion 17 U of the stator portion 3 to become intensive. Accordingly, an electric current flows through the wound portions 17U and 17L so as to generate magnetic lines counteracting the changes of the magnetic flux. It will be describe in detail about the current flowing through the wound portion 17U and 17L.

Figure 7:
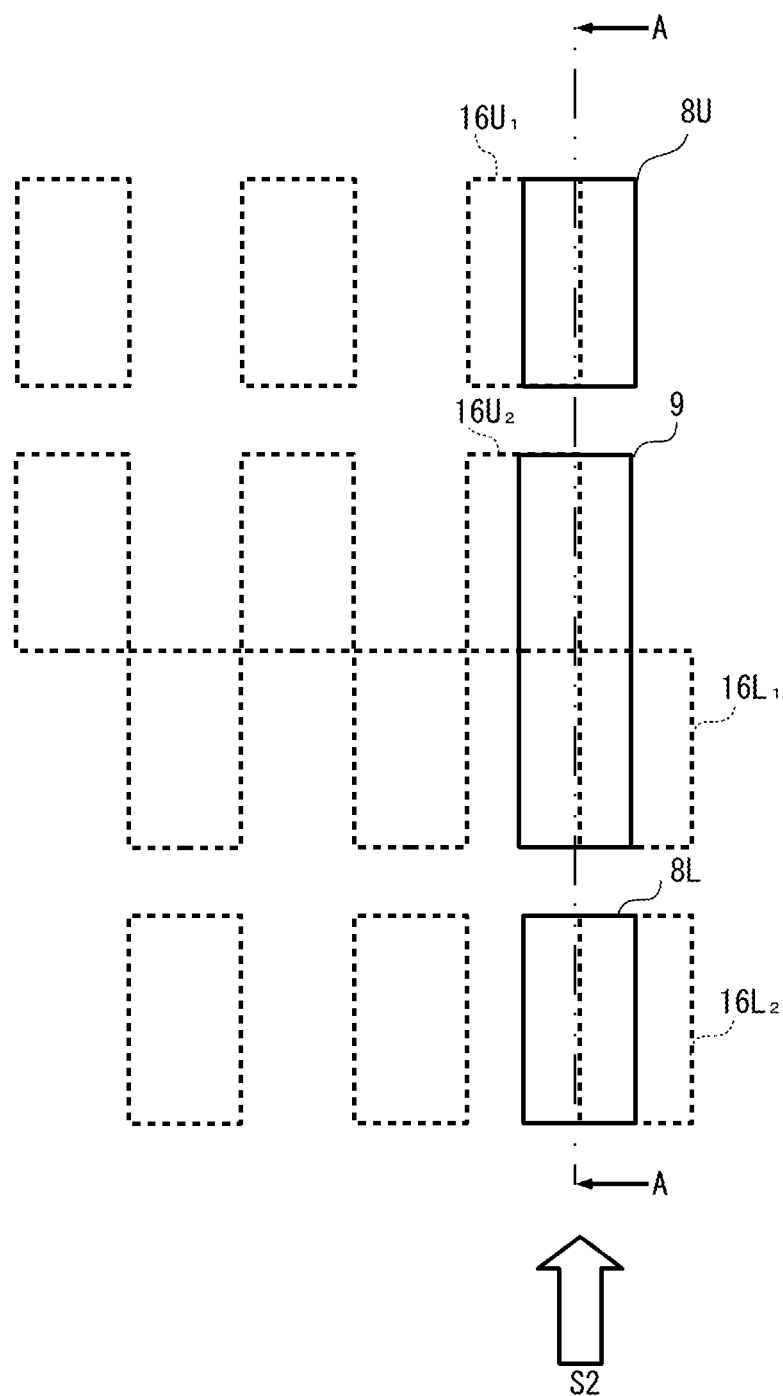
FIG. 7 shows a state S2 where the rotor side protrusions (solid lines) of the rotor portion shown in FIG. 1 and the stator side protrusions (dashed lines) of the stator portion shown in FIG. 2 have another predetermined positional relationship.
Figure 8:
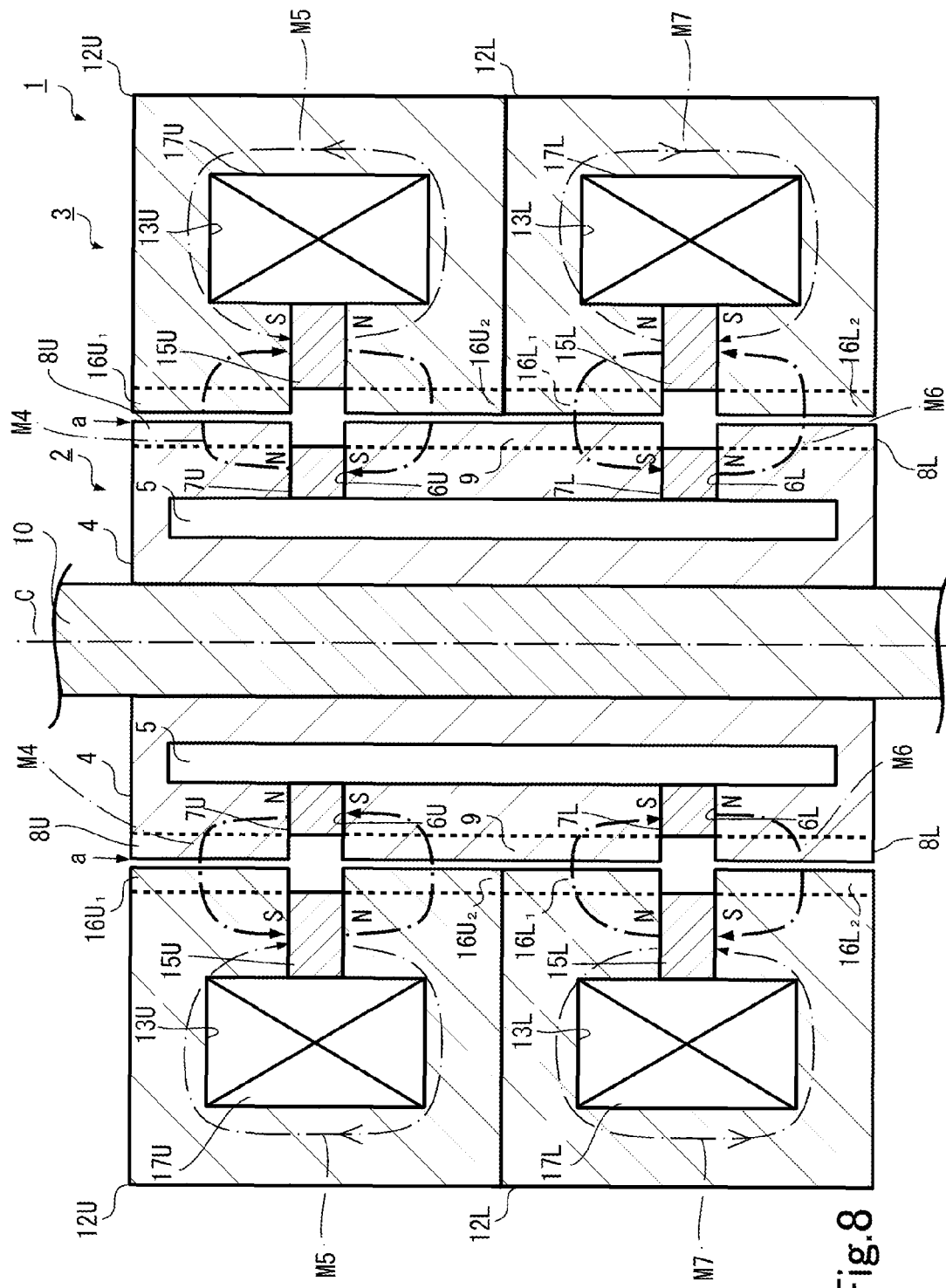
FIG. 8 schematically shows a state of magnetic paths in the electric generator in the state S2 of the predetermined relationship shown in FIG. 7 with cutting along the A-A line shown in FIG. 7.

As shown in FIG. 7, a state S2 is defined as each half of the protrusions 8U, 9 and 8L in view of the circumferential direction is opposed to each half of the protrusions $16U_1$, $16U_2$, $16L_1$, and $16L_2$ in the same direction. In such a state S2, as shown in FIG. 8 illustrating a cross section along the line A-A in FIG. 7, in comparison with the state S1, a part of magnetic flux of the permanent magnet 15U of the stator yoke 12U directs to the rotor portion 1 side and directs from the protrusion $16U_2$ of the stator portion 3 to the rotor portion 2 side. On the other hand, most of the magnetic flux of the permanent magnet 7U of the rotor portion 2 side directs to the stator portion 3 side. That is, it directs from the protrusion 8U of the rotor portion 2 to the stator portion 3 side. As a result, a magnetic path M4 is formed directing from the north pole of the permanent magnet 7U of the rotor portion 2 side to the south pole of the permanent magnet 15U of the stator portion 3 side and directing from the north pole of the permanent magnet 15U of the stator portion 3 side to the south pole of the permanent magnet 7U of the rotor portion 2 side. According to this, the magnetic flux of the magnetic path M5 passing around the wound portion 17U is weakened as compared with the magnetic path M1 in the state S1 (shown as S1: thick dashed-dotted lines to S2: thin dashed-dotted lines).

In the state S2, a part of magnetic flux of the permanent magnet 7L of the rotor portion 2, which has directed to the stator yoke 12 side of the stator portion 3 in the state S1, passes through the hollow portion 5 to return the rotor 2 side. A part of the magnetic flux of the permanent magnet 15L also becomes to pass around the wound portion 17L. That is, compared to the state S1, a magnetic path M6 is formed by weak magnetic lines directing from the north pole of the permanent magnet 7L of the rotor portion 2 side to the south pole of the permanent magnet 15L of the stator portion 3 side and from the north pole of the permanent magnet 15L of the stator portion 3 side to the south pole of the permanent magnet 7L of the rotor portion 2 side. The magnetic flux of the magnetic path M7 passing around the wound portion 17 is made intensive as compared to the state S1 (shown as S1: thick dashed-dotted lines to S2: thin dashed-dotted lines). The magnetic path M2 described above is yielded in the rotor portion 2 opposing to the protrusions 16L1 and 16L2 of the stator portion 3 and its intensity becomes weak. In the state S1, a magnetic path M9 described below is also yielded and its intensity is becoming intensive.

In the state S2 as described above, compared to the state S1, changes are happened such that the magnetic flux passing around the wound portion 17U is made weak and that the magnetic flux passing around the wound portion 17L is made intensive. so that an electric current flows so as to generate magnetic lines counteracting L the changes of the magnetic flux. Since the permanent magnets 7U and 7L of the rotor portion 2 are arranged for opposing portions to be different and to be connected by the hollow portion 5, the magnetic flux of the respective permanent magnets 7U and 7L directs to the stator portion 3 effectively.

Figure 9:
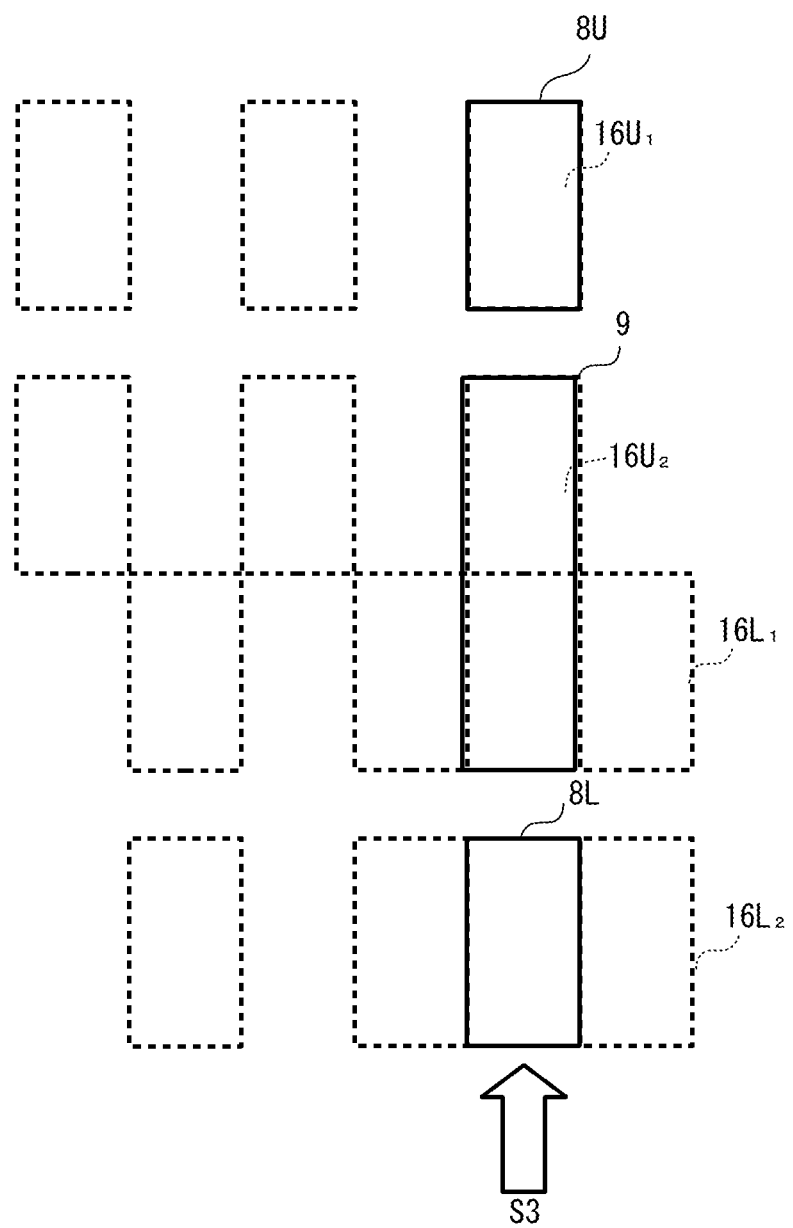
FIG. 9 shows a state S3 where the rotor side protrusions (solid lines) of the rotor portion shown in FIG. 1 and the stator side protrusions (dashed lines) of the stator portion shown in FIG. 2 have another predetermined positional relationship.

As shown in FIG. 9, a state S3 is defined as the protrusion $16L_1$ and $16L_2$ are not opposed to any of the protrusions 8U, 9 and 8L of the rotor portion 2, an upper half of the protrusion 9 of the rotor portion 2 is opposed to the protrusion $16U_2$ of the stator portion 3 and the protrusion 8U of the rotor portion 2 is opposed to the protrusion $16U_1$ of the stator portion 3.

Figure 10:
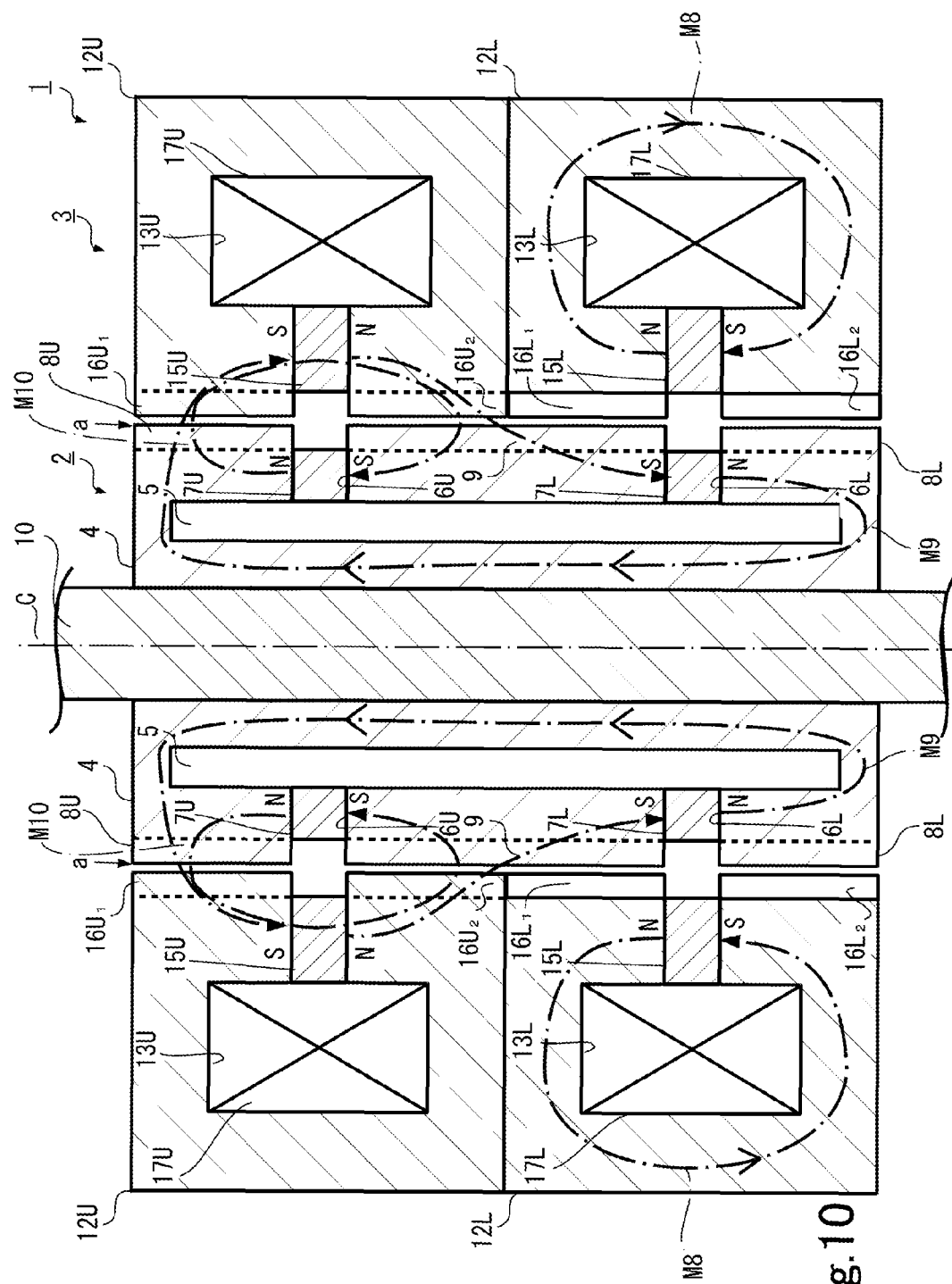
FIG. 10 schematically shows a state of magnetic paths in the electric generator in the state S3 of the predetermined relationship shown in FIG. 9.

As shown in FIG. 10, the state S3 can be interpreted as an upside down state of the state S1 shown in FIG. 6. That is, since the stator yoke 12L of the stator portion 3 is not affected so much by the attractive force from the protrusions 9 and 8L of the rotor portion 2, the magnetic flux from the noth pole of the permanent magnet 15L forms a magnetic path M8 (shown by dashed-dotted lines) passing around the hollow portion 13L and returning to the south pole of the permanent magnet 15L. At this time, since the magnetic flux of the permanent magnet 7L of the rotor portion 2 is strongly affected by the protrusions $16U_1$ and $16U_2$ of the stator yoke 12U of the stator portion 3 rather than the protrusions $16L_1$ and $16L_2$ of the stator yoke 12L, most of the magnetic flux of rotor portion 2 is directed to the stator yoke 12U side. Since the protrusions $16U_1$ and $16U_2$ of the stator portion 3 become very close to the protrusions 8L and 9L of the rotor portion 2, most of the magnetic flux of the permanent magnet 7U of the rotor portion 2 directs from the protrusion 8U of the rotor portion 2 to the stator yoke 12U side. Thus, as shown in FIG. 10, a magnetic path M9 is formed in the rotor portion 2 side starting from the north pole of the lower end face of the permanent magnet 7L, passing around the hollow portion 5 from the vicinity of the lower end face of the rotor yoke 5, once entering into the stator yoke 2 side at the vicinity of the upper end face of the rotor yoke 4, entering into the stator yoke 12U side at the vicinity of the lower end face of the stator yoke 12U, and returning to the noth pole of the upper end face of the permanent magnet 7L.

A magnetic path M10 is also formed such that the magnetic flux of the permanent magnet 15U of the stator yoke 12U of the stator portion 3 directs to the protrusion 9 of the rotor portion 2 and the magnetic flux of the permanent magnet 7U of the rotor portion 2 directs from the protrusion 8U of the rotor portion 2 to the protrusion $16U_1$ of the stator portion 3.

In the state S3 as described above, changes are happened on the wound portions 17U and 17L such that most of the magnetic flux of the permanent magnet 15U having passed around the wound portion 17U until just before the state S3 is absorbed into the rotor portion 2 side to become weak and that the magnetic flux of the permanent magnet 15L having directed to the rotor portion 2 side until just before the state S3 returns to the magnetic path passing around the wound portion 17 U of the stator portion 3 to become intensive to form a magnetic path M8. Accordingly, an electric current flows through the wound portions 17U and 17L so as to generate magnetic lines counteracting the changes of the magnetic flux.

Figure 11:
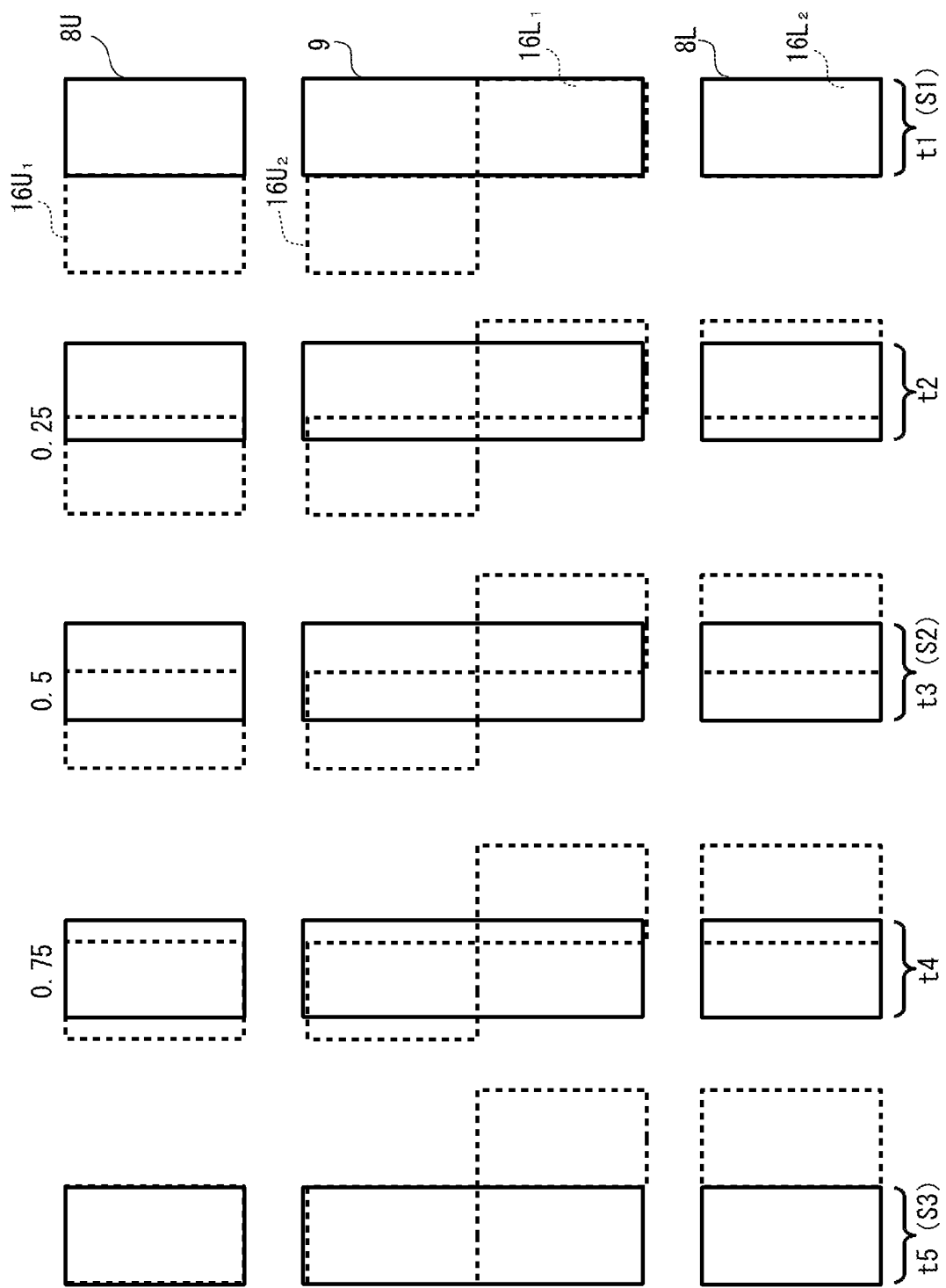
FIG. 11 shows changes of the relationships between the rotor side protrusions (solid lines) of the rotor portion shown in FIG. 1 and the stator side protrusions (dashed lines) of the stator portion shown in FIG. 2 as time advances (times t1 to t5).
Figure 12:
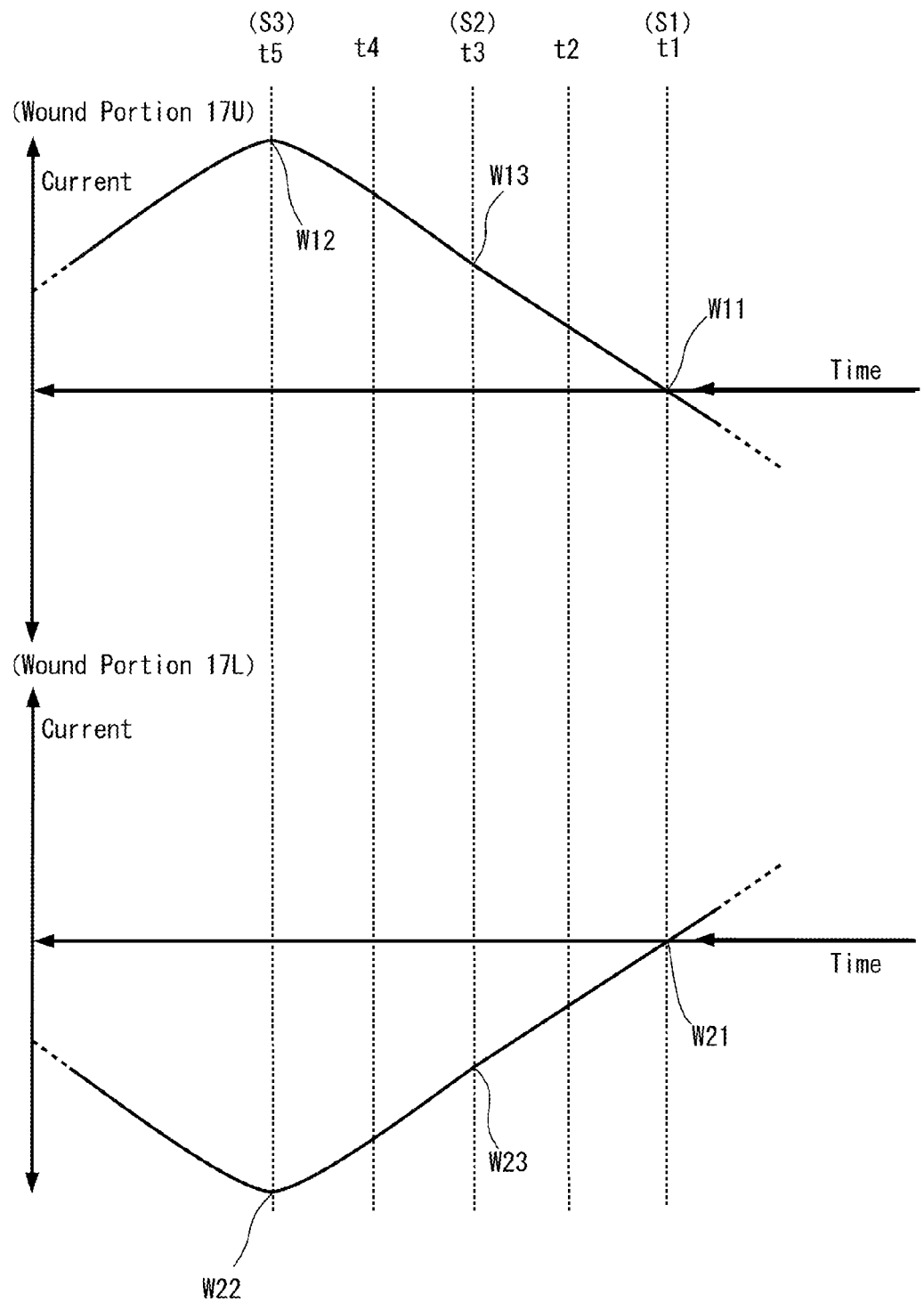
FIG. 12 schematically shows a current occurring state on two wound portions in the electric generator as time advances (times t1 to t5).

FIG. 11 shows a positional relationship between the protrusions 8U, 9 and 8L of the rotor portion 2 and the protrusions $16U_1$, $16U_2$, $16L_1$ and $16L_2$ of the stator portion 3, along with a process of transitions of the states S1, S2 and S3 from S1 through S2 to S3 over passing time of t1 to t5. FIG. 12 shows a state of the electric current generated on the wound portions 17U and 17L of the electric generator 1 at each time of t1 to t5. As shown in FIG. 12, an electric current occurs in a sinusoidal wave form by rotating the rotor portion 2 in a constant rate. In the example shown in FIG. 12, the current is generated in the opposite directions at the wound portions 17U and 17 L because these wires are wound in a same direction and the directions of the magnetic lines on the wound portions 17U and 17L are opposing. If the winding directions of the wound portions 17U and 17 L are made opposite, it can be generate the current in a same direction on the wound portions 17U and 17 L.

In FIG. 12, the time t1 corresponds to the state S1 shown in FIG. 6. At the time t1, since a lower half of the protrusion 9 of the rotor portion 2 and the protrusion 8L of the same are opposed to the protrusions $16L_1$ and $16L_2$ of the stator portion 3, and the magnetic flux around the wound portion 17U becomes a maximum and then decreases, an electric current starts to flow in a direction through the wire so as to generate magnetic lines counteracting the change of the magnetic flux. Defining this direction as positive, a positive current is starting to flow. It is shown in FIG. 12 by a point W11. On the other hand, since the magnet flux around the wound portion 17L becomes a minimum and then increases, an electric current starts to flow through the wire so as to generate magnetic lines counteracting the change of the magnetic flux. This direction is the reverse of that of the wound portion 17U. This reverse direction is defined as negative in opposition to the positive described above. It is shown in FIG. 12 by a point W12. At this time, the lower part of the rotor portion 2 is generating a maximum attractive force with the stator portion 3.

Therefore, at time t1, as shown in FIG. 12, since reversal of the direction of current flow occurs on the wound portion 17U and 17L 17L, it takes an intermediate point of positive and negative values in the AC curve. That is, at the time t1, as shown in FIG. 12, neither positive current nor negative current flows at the wound portions 17U and 17L (minimum current value=0 amp).

In FIG. 12, the time t5 corresponds to the state S3 shown in FIG. 10. At the time t5, since an upper half of the protrusion 9 of the rotor portion 2 and the protrusion 8U of the same are opposed to the protrusions $16U_1$ and $16L_2$ of the stator portion 3, and the magnetic flux around the wound portion 17L becomes a maximum and then decreases, an electric current starts to flow in a direction through the wire so as to generate magnetic lines counteracting the change of the magnetic flux. This direction may be defined as negative in accordance with the above mentioned basis. It is shown in FIG. 12 by a point W12. On the other hand, since the magnet flux around the wound portion 17U becomes a minimum and then increases, an electric current starts to flow through the wire so as to generate magnetic lines counteracting the change of the magnetic flux. This direction is the reverse of that of the wound portion 17L. This direction is positive in relation to the negative described above. It is shown in FIG. 12 by a point W22. At this time, the upper part of the rotor portion 2 is generating a maximum attractive force with the stator portion 3.

Therefore, at the time t5 as shown in FIG. 12, a current of the positive maximum (W12) is generated at the wound portion 17U and a current of the negative maximum (W22) is generated at the wound portion 17L.

The time t3 corresponds to the state S2 shown in FIG. 8. At the time t3, each half of the protrusions 8U, 9 and 8L of rotor portion 2 in the circumferential direction is opposed to each half of the protrusions $16U_1$, $16U_2$, $16L_1$ and $16L_2$ in the same direction. The point of the time t3 is an intermediate point of the transition from the state S1 to the state S5. Therefore, at the time as shown in FIG. 12, a current is generated in a medial value between the maximum and minimum (0 amp) values in positive or negative at each of the wound portions 17U and 17L.

The times t2 and t4 correspond to transitions from the state S1 to the state S2 and from the state S2 to the state S3 respectively. Therefore, at the time t2 as shown in FIG. 12, a current is generated in a medial value between the current values generated at the state S1 (0 amp) and at the state S2. On the other hand, at the time t4 as shown in FIG. 12, a current is generated in a medial value between the current values generated at the state S2 and at the state S1 (0 amp).

In this way, at the times t1 to t5, a current occurs in a quarter cycle of a sinusoidal waveform to be generated on the wound portions 17U and 17L. That is, when the rotation shaft 10 of the electric generator 1 is rotating in a constant rate, one cycle part of the sinusoidal current waveform to be generated on the wound portion 17U and 17L is completed in four times periods of the times t1 to t5.

Here, considering the reason why cogging is generated in a general electric generator, cogging would be caused by changing of attractive or repulsive force between a rotor side and a stator side according to the rotor position. According to the electric generator 1 of this embodiment on the other hand, the attractive force will be constant between protrusions 8U, 8 and 8L of the rotor portion 2 and protrusions $16U_1$, $16U_2$, $16L_1$ and $16L_2$ of the stator portion 3 in any positional relationship of the rotor portion 2 and the stator portion 3 at the times t1 to t5.

For example, at the time t1 (the state S1), the lower half of the protrusion 9 of the rotor portion 2 and the protrusion 8L of the same are fully opposed to the protrusions $16L_1$ and $16L_2$ of the stator portion 3 and are attracting them in the maximum attractive force. On the other hand, the protrusion $16U_1$ and $16U_2$ of the stator portion 3 are not opposed to any of the protrusions 8U, 9 and 8L of the rotor portion 2 and the attractive force therebetween becomes a minimum. Therefore, it can be considered that the strength of the attractive force between the protrusions 8U, 9 and 8L of the rotor portion 2 side and the protrusions $16U_1$, $16U_2$, $16L_1$ and $16L_2$ of the stator portion 3 side depend on the total of the strengths of the opposing and non-opposing areas therebetween.

Supposing Q cm² (square centimeter) as a maximum value of an area where the protrusion $16U_1$, $16U_2$, $16L_1$ or $16L_2$ of the stator portion 3 is opposed to the protrusions 8U, 9, and 8L of the rotor portion 2, and P1 as strength of attractive force per 1 cm² unit, then, at the time t1, the opposing area between the lower half of the protrusion 9 of the rotor portion 2 and the protrusion $16L_1$ of the stator portion 3 becomes Q cm² and the attractive force becomes Q×P1. The opposing area between the protrusion 8L of the rotor portion 2 and the protrusion $16L_2$ of the stator portion 3 also becomes Q cm² and the attractive force becomes Q×P1. The non-opposing area between the protrusion 8L of the rotor portion 2 and the protrusion $16U_1$ of the stator portion 3 and the non-opposing area between the upper half of the protrusion 9 of the rotor portion 2 and the protrusion $16U_2$ of the stator portion 3 are Q cm² respectively and the attractive forces become Q×P2 respectively where P2 is strength of attractive force per 1 cm² unit. Therefore, the attractive force between the rotor portion 2 and stator portion 3 becomes 2Q×P1+2Q×P2=2Q(P1+P2) at the time t1 on each of the protrusions 8U, 9, 8L, $16U_1$, $16U_2$, $16L_1$ and $16L_2$.

Similarly, at the time t2, the protrusion 8U of the rotor portion 2 is opposed to the protrusions $16U_1$ of the stator portion 3 at respective quarters in the circumferential direction, the protrusion 9 of the rotor 2 is opposed to the protrusion $16U_2$ of the stator portion 3 at a quarter in the circumferential direction of the upper half of the former and a quarter in the same direction of the latter, the protrusion 9 of the rotor 2 is opposed to the protrusion $16L_1$ of the stator portion 3 at three quarters in the circumferential direction of the lower half of the former and three quarters in the same direction of the latter, and the protrusion 8L of the rotor 2 is opposed to the protrusion $16L_2$ of the stator portion 3 at three quarters in the circumferential direction of the former and three quarters in the same direction of the latter to attract each other.

In this case, the opposing areas are (¼)Q cm² for between the protrusion 8U of the rotor portion 2 and the protrusion $16U_1$ of the stator 3 and for between the upper half of the protrusion 9 of the rotor portion 2 and the protrusion $16U_2$ of the stator 3 respectively, and (¾)Q cm² for between the lower half of the protrusion 9 of the rotor portion 2 and the protrusion $16L_1$ of the stator 3 and for between the protrusion 8L of the rotor portion 2 and the protrusion $16L_2$ of the stator 3 respectively. Therefore, at the time t1, the total attractive force between the rotor portion 2 and stator portion 3 on the opposing parts of each of the protrusions 8U, 9, 8L, $16U_1$, $16U_2$, $16L_1$ and $16L_2$ becomes as follows:

$$(1/4)Q \text{ cm}^2 \times P1 + (1/4)Q \text{ cm}^2 \times P1 + (3/4)Q \text{ cm}^2 \times P1 +$$
$$(3/4)Q \text{ cm}^2 \times P1 = (8/4)Q \text{ cm}^2 \times P1 = 2Q \text{ cm}^2 \times P1$$

On the other hand, the attractive force of the non-opposing parts can be similarly calculated to become 2Qcm²×P1. Therefore, the attractive force at the time 2 becomes 2Q×P1+2Q×P2=2Q(P1+P2) same as that at the time t1.

Similarly, at time t3, the protrusion 8U of the rotor portion 2 is opposed to the protrusions $16U_1$ of the stator portion 3 at respective halves in the circumferential direction, the protrusion 9 of the rotor 2 is opposed to the protrusion $16U_2$ of the stator portion 3 at a half in the circumferential direction of the upper half of the former and a half in the same direction of the latter, the protrusion 9 of the rotor 2 is opposed to the protrusion $16L_1$ of the stator portion 3 at a half in the circumferential direction of the lower half of the former and a half in the same direction of the latter, and the protrusion 8L of the rotor 2 is opposed to the protrusion $16L_2$ of the stator portion 3 at respective halves in the circumferential direction to attract each other.

In this case, the opposing areas are (½)Q cm² for between the protrusion 8U of the rotor portion 2 and the protrusion $16U_1$ of the stator 3, for between the upper half of the protrusion 9 of the rotor portion 2 and the protrusion $16U_2$ of the stator 3, for between the lower half of the protrusion 9 of the rotor portion 2 and the protrusion $16L_1$ of the stator 3 and for between the protrusion 8L of the rotor portion 2 and the protrusion $16L_2$ of the stator 3 respectively. Therefore, at the time t3, the total attractive force between the rotor portion 2 and stator portion 3 on the opposing parts of each of the protrusions 8U, 9, 8L, $16U_1$, $16U_2$, $16L_1$ and $16L_2$ becomes as follows:

$$(1/2)Q \text{ cm}^2 \times P1 + (1/2)Q \text{ cm}^2 \times P1 + (1/2)Q \text{ cm}^2 \times P1 +$$
$$(1/2)Q \text{ cm}^2 \times P1 = (4/2)Q \text{ cm}^2 \times P1 = 2Q \text{ cm}^2 \times P1$$

On the other hand, the attractive force of the non-opposing parts, which are parts of the stator portion 3 other than the protrusions $16U_1$, $16U_2$, $16L_1$ and $16L_2$ being opposed to the protrusions 8U, 8 and 8L, becomes 2Qcm²×P2 as the area of the non-opposing parts becomes Q2 cm². Therefore, the total attractive force at the time t3 becomes 2Q(P1+P2) same as that at the times t1 and t2.

Similarly, at time t4, the protrusion 8U of the rotor portion 2 is opposed to the protrusions $16U_1$ of the stator portion 3 at respective three quarters in the circumferential direction, the protrusion 9 of the rotor 2 is opposed to the protrusion $16U_2$ of the stator portion 3 at three quarters in the circumferential direction of the upper half of the former and three quarters in the same direction of the latter, the protrusion 9 of the rotor 2 is opposed to the protrusion $16L_1$ of the stator portion 3 at a quarter in the circumferential direction of the lower half of the former and a quarter in the same direction of the latter, and the protrusion 8L of the rotor 2 is opposed to the protrusion $16L_2$ of the stator portion 3 at respective quarters in the circumferential direction to attract each other.

In this case, the opposing areas are (¾)Q cm² for between the three quarters of the protrusion 8U of the rotor portion 2 and the three quarters of the protrusion $16U_1$ of the stator 3 and for between the three quarters of the upper half of the protrusion 9 of the rotor portion 2 and the three quarters of the protrusion $16U_2$ of the stator 3 respectively, and (¼) Q cm² for between the quarter of the lower half of the protrusion 9 of the rotor portion 2 and the quarter of the protrusion $16L_1$ of the stator 3 and for between the quarter of the protrusion 8L of the rotor portion 2 and the quarter of the protrusion $16L_2$ of the stator 3 respectively. Therefore, at the time t4, the total area of the fully opposing parts of the protrusions 8U, 9, 8L, $16U_1$, $16U_2$, $16L_1$ and $16L_2$ between the rotor portion 2 and stator portion 3 is as follows:

$$(3/4)Q \text{ cm}^2 + (3/4)Q \text{ cm}^2 + (1/4)Q \text{ cm}^2 + (1/4)Q \text{ cm}^2 =$$

$$(8/4)Q \text{ cm}^2 = 2Q \text{ cm}^2$$

Therefore, the attractive force caused by the protrusions being opposed each other becomes 2Q×P1. On the other hand, the area of the protrusions 8U, 9 and 8L of the rotor portion 2 being opposed to the protrusions $16U_1$, $16U_2$, $16L_1$ and $16L_2$ of the stator portion 3 becomes 2Qcm² so that the total attractive force becomes 2Q(P1+P2) same as that at the times t1, t2 and t3.

Similarly, at time t3 (the state S3), the upper half of the protrusion 9 of the rotor 2 and the protrusion 8U of the same is opposed to the protrusions $16U_1$ and $16U_2$ of the stator portion 3 and attract therebetween, but the protrusions $16L_1$ and $16L_2$ of the stator portion 3 are not opposed to any of the protrusions 8U, 9 and 8L of the rotor portion 2. In this case, the opposing areas are Q cm² for between the upper half of the protrusion 9 of the rotor portion 2 and the protrusion $16U_2$ of the stator 3 and for between the protrusion 8U of the rotor portion 2 and the protrusion $16U_1$ of the stator 3 respectively. Therefore, at the time t5, the total area of the fully opposing parts of the protrusions 8U, 9, 8L, $16U_1$, $16U_2$, $16L_1$ and $16L_2$ between the rotor portion 2 and stator portion 3 is as follows:

$$Q\text{cm}^2 + Q\text{cm}^2 = 2Q\text{cm}^2$$

Therefore, the attractive force caused by the protrusions being opposed each other becomes 2Q×P1. On the other hand, the area of the protrusions 8U, 9 and 8L of the rotor portion 2 being opposed to the protrusions $16U_1$, $16U_2$, $16L_1$ and $16L_2$ of the stator portion 3 becomes 2Qcm² so that the total attractive force becomes 2Q(P1+P2) same as that at the times t1, t2, t3 and t3.

As described above, the total attractive force between the rotor portion 2 and the stator portion 3 on each of the protrusions 8U, 9, 8L, $16U_1$, $16U_2$, $16L_1$ and $16L_2$ does not change at any of the times t1 to t5 shown in FIGS. 11 and 12. The current waveform occurring at the times t1 to t5 is a waveform of a quarter cycle of the sinusoidal waveform to be generated on the wound portions 17 U and 17L. A sinusoidal wave is to be continued by the quarter cycle of the current waveform with changing the increasing and decreasing direction and the positive and negative direction. Therefore, it is obvious that the attractive force becomes constant at all times between the protrusions 8U, 9 and 8L of the rotor portion 2 and the protrusions $16U_1$, $16U_2$, $16L_1$ and $16L_2$ of the stator portion 3 at any part of the sinusoidal current waveform to be generated on the wound portions 17U and 17 L. This means that the attractive force is always constant between the rotor portion 2 and the stator portion 3 even how the positional relationship thereof is. Therefore it is obvious that no cogging occurs in the electric generator 1.

The electric generator in which no cogging occurs as described above can generate power in high efficiency because rotation torque applied on the rotation shaft 10 from outside is not reduced by cogging torque and most of it is used a torque for electric generation.

In the electric generator 1, the hollow portion 5 of the rotor portion 2 is continuously passing through the two permanent magnets 7U and 7L. According to this, as shown in FIGS. 6 and 10, the magnetic flux of the two permanent magnets 7U and 7L of the rotor portion 2 forms one magnetic path M2 or M9 without the respective magnetic fluxes of the permanent magnets 7U and 7L being divided. On one side of the permanent magnets 7U and 7L, the magnetic fluxes are direct into the stator portion 3 integrally so that magnetic flux passing around the wound portion 17U or 17L can be reduced almost perfectly while, on the other side the permanent magnets 7U and 7L, less of the magnetic flex direct into the stator portion 3 so that the flux passing around the permanent magnet 7U or 7L can be used up to the maximum. Consequently, power generating efficiency can be further improved.

Figure 13:
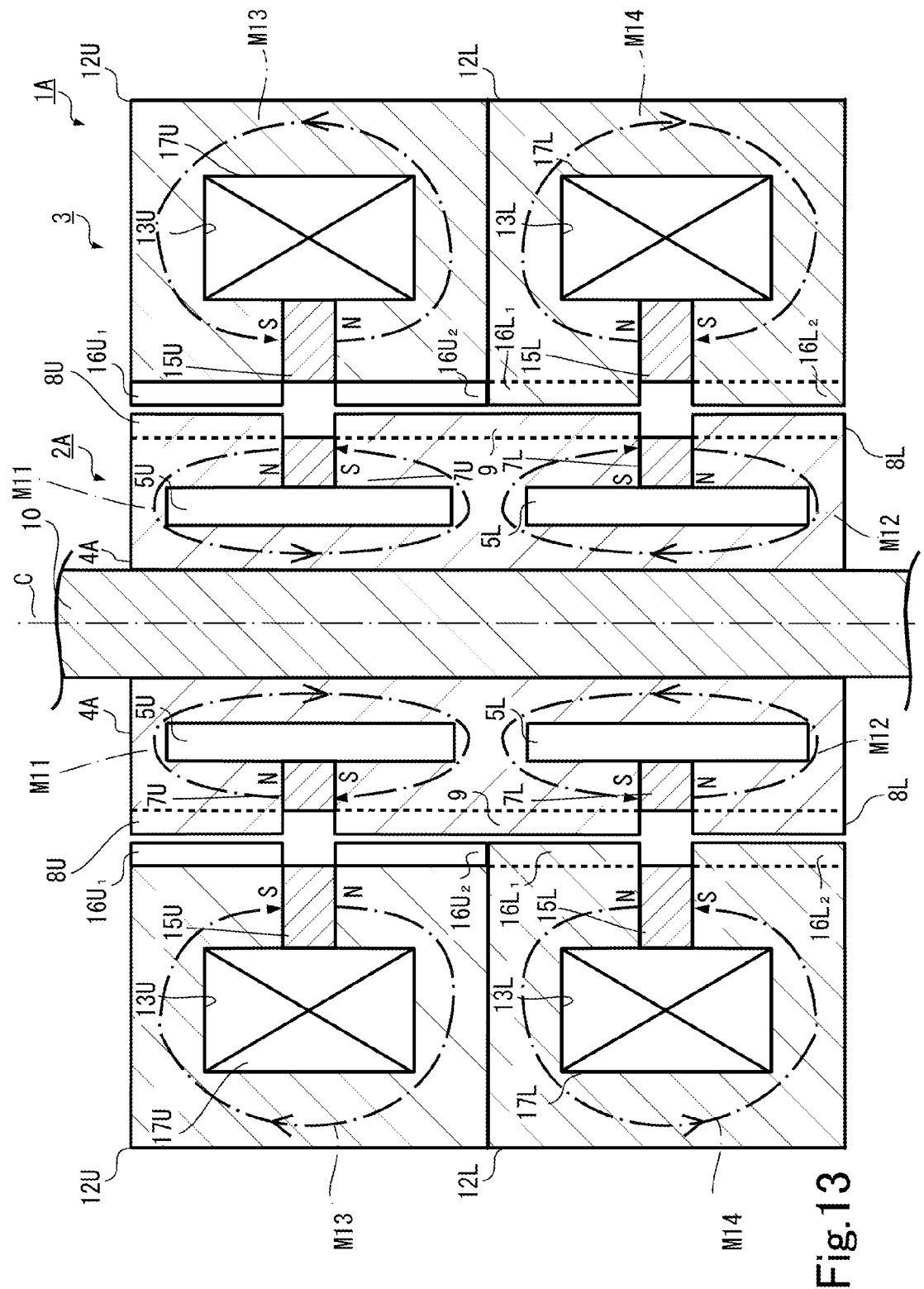
FIG. 13 schematically shows, as comparative example, a magnetic path in an electric generator which has a bypassing portion in a rotor side yoke.

FIG. 13 shows, as a comparative example, a rotor portion 2A comprising two hollow portions 5U and 5L. FIG. 13 shows an example in the state S1 same as FIG. 6, wherein loops of magnetic fluxes of the respective permanent magnets 7U and 7L of the rotor portion 2A are divided each other and magnetic paths M11 and M12 are formed as individual closed loops. As a result, a magnetic path M13 occurs around the wound portion 17U and a magnetic path M14 occurs around the wound portion 17L. It hardly changes at any state of the times t1 to t5 shown in FIG. 11. It makes the difference between the maximum and the minimum of the magnetic path occurring around the wound portion 17U and 17L small so that the electric generator 1A cannot fully function for a generator. However, some extent of magnetic flux may occur in this configuration, this configuration may be adopted.

Other Embodiments

The embodiment described above can be modified in various ways without departing from the scope of the invention. For example, the hollow portion 5 may not be hollow and be embedded by non-magnetic material such as aluminum or resin material. Although it has been described that each of the protrusions 8U, 9 and 8L is formed integrally with the body of the yoke 4 and each of the protrusions $16U_1$, $16U_2$, $16L_1$ and $16L_2$ is formed integrally with the body of the yoke 12U and 12L, each protrusion may not be formed integrally but be made as a separated member and fixed on the respective body by such as glue.

Figure 14:
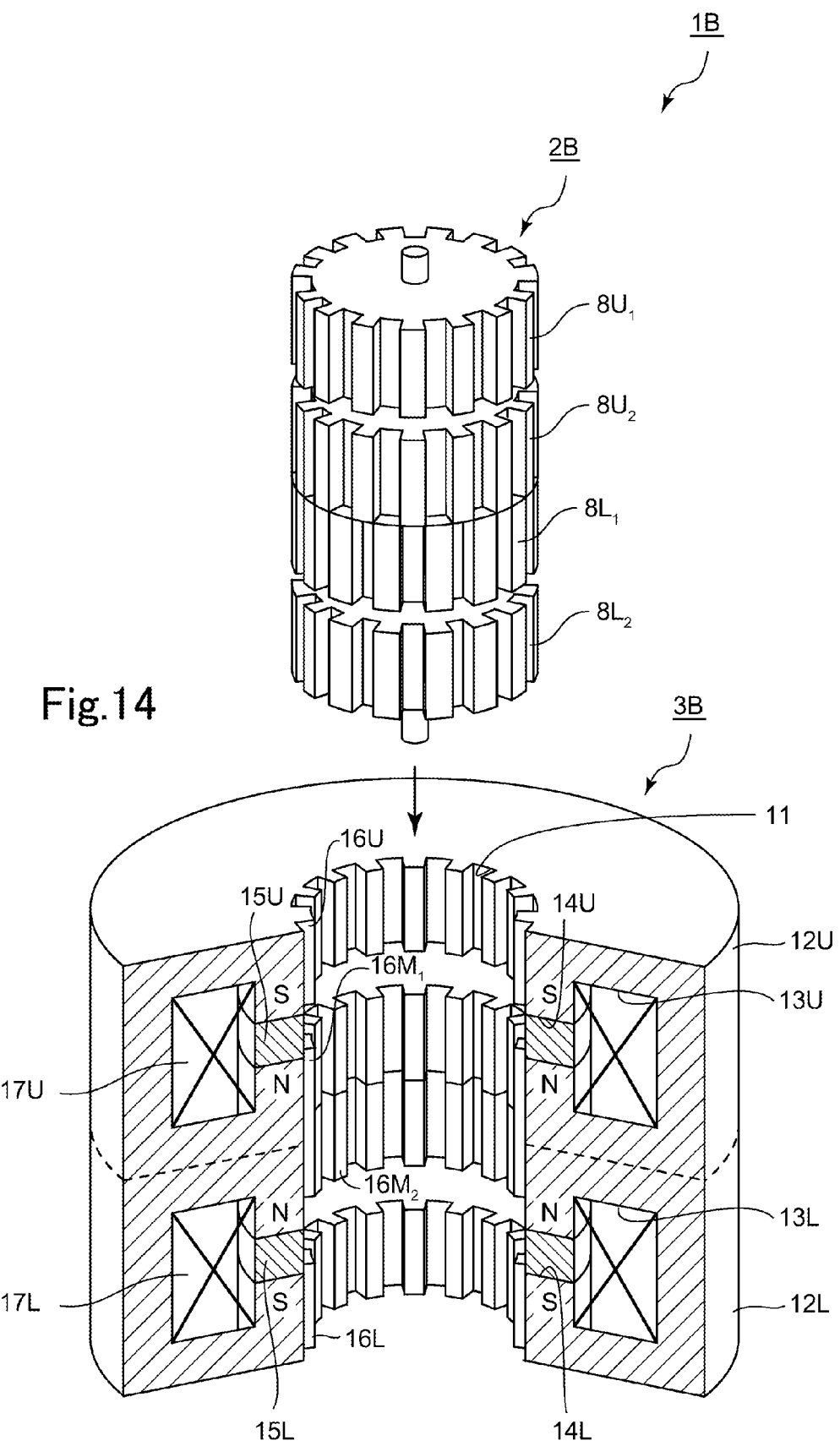
FIG. 14 shows a perspective view of an arrangement of a rotor portion and a stator portion of an electric generator according to another embodiment with cutting out partly.

In the embodiment shown in FIG. 14, a rotor portion 2B comprises four protrusions $8U_1$, $8U_2$, $8L_1$ and $8L_2$ along the axial direction and the protrusions $8U_1$ and $8U_2$ are arranged to shift by a half pitch with the protrusions $8L_1$ and $8L_2$ on the axial direction. On the other hand, the stator portion 3B comprises three protrusions 16U, 16M and 16L along the axial direction. Configuring such an electric generator 1B, it can be realize the function same as that of the electric generator 1 according to the above described embodiment.

In this case, the rotor portion 2B may be configured by arranging to pile one rotor member having protrusions $8U_1$ and $8U_2$ along the central axis direction with a same pitch and another rotor member having protrusions $8L_1$ and $8L_2$ with the same pitch linearly arranged in the axial direction, in two stages, such that the protrusion $8U_1$ and $8U_2$ are shifted a half pitch with the protrusions $8L_1$ and $8L_2$. The stator portion 3B may also be configured by arranging to pile one stator member having protrusions 16U and $16M_1$ with a same pitch linearly arranged in the axial direction and another stator member having protrusions 16M$_2$ and 16L with the same pitch linearly arranged in the axial direction, in two stages, such that the protrusion 16U, 16M$_1$, 16M$_2$ and 16L are linearly arranged in the axial direction and have the same pitch. The rotor portion 2B and/or the stator portion 3B may be made from on yoke member by, for example, cutting out.

Although it has been described that each of the electric generators 1 and 1B comprises the stator portion 3 having a two stage piled structure of the stator yokes 12U and 12L, the number of the piled stages may be any even number. In this case, the rotor portion part 2 preferably has a construction in that the structure shown in FIG. 14 is piled along the axial direction. Similarly, although it has been described that the electric generator 1B comprises the rotor portion 2B consisting of a rotor member of a two stage piled structure, the rotor portion 2B may be preferred to be piled same structures and the number of the piled stages may be any even number.

Although it has been described that each of the electric generators 1 and 1B is an inner rotor type generator, an outer rotor type generator may be adopted. Although the rotor yoke 4 and the stator yokes 12U, 12L are preferable made of soft magnetic material, these may be made by simple magnetic material. Grooves 6U, 6L, 14U and 14L may not be grooved if each of them is formed integrally with the permanent magnet but these are called as "grooves" including ones formed integrally. Although the axial length of the hollow portion 5 as a non-magnetic portion is set equal or longer than the axial distance between the outer ends of the combination of the permanent magnetics 7U and 7L, it may be equal to, slightly longer or slightly shorter that the axial distance between the outer ends of the permanent magnetics 7U and 7L. Although the width of each protrusion and the distance between protrusions are preferably equal for cogging to be suppressed, the width the distance may not be equal and be set slightly different by another requirement.

Figure 15:
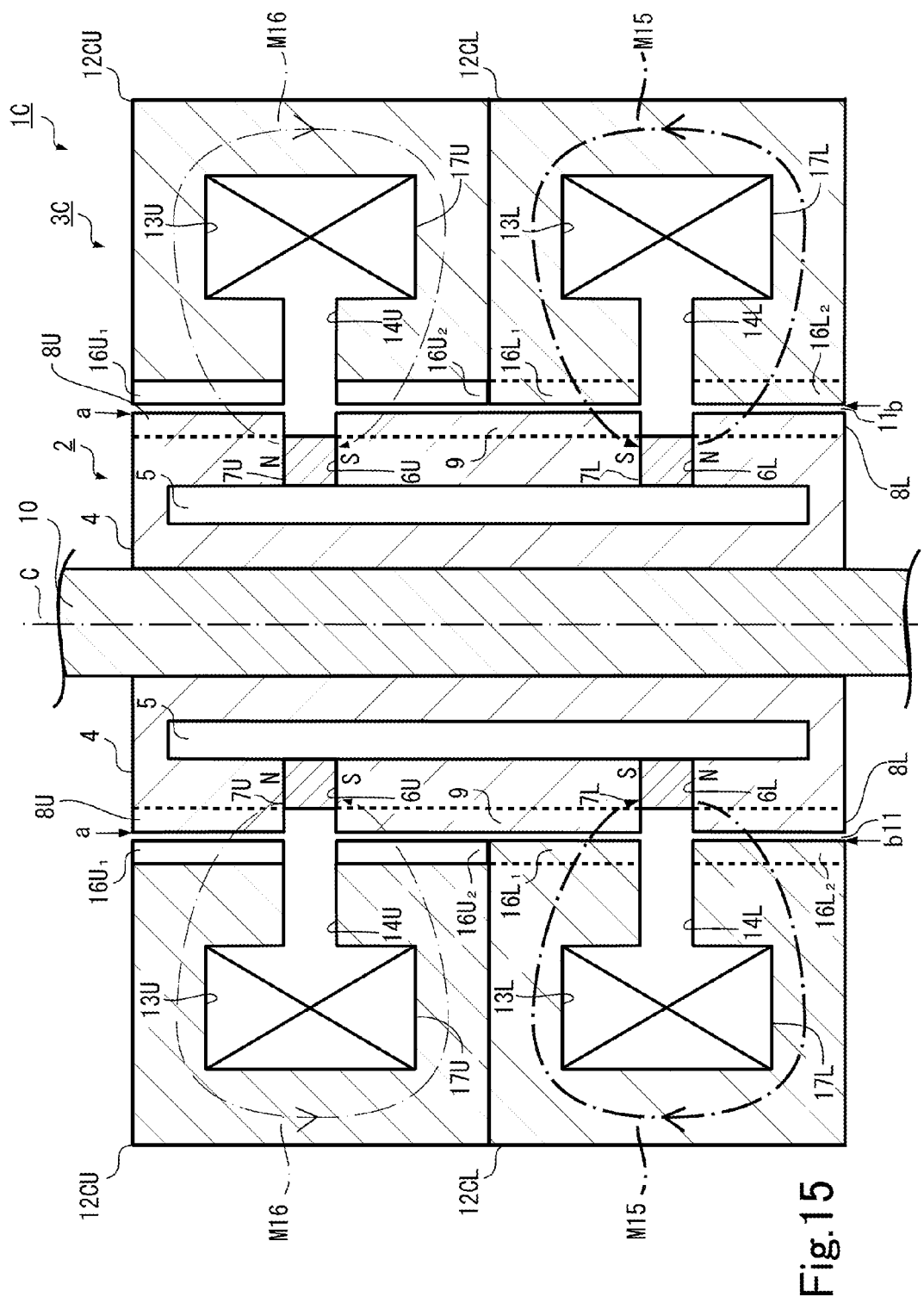
FIG. 15 shows main parts of an electric generator according to another embodiment by a cross section along the central axe of a rotor portion.

As shown in FIG. 15, an electric generator 1C may be configured by comprising stator yokes 12CU and 12CL on which the permanent magnets 15U, and 15L are not provided. That is, the electric generator 1C is configured so as to use the spaces where the permanent magnetics 15U, and 15L are removed from the stator portion 3 of the electric generator 1 as a non-magnetic portion. This space may be filled by resin, aluminum which is a non-magnetic material, or the like. Although the electric generator operates similar to the electric generators 1, 1B according to the embodiments described above, the current waveform shown in FIG. 12 should be inversed at the wound portions respectively because the permanent magnets 15U and 15L are not provided ion the stator portion 3C.

The state shown in FIG. 15, for example, corresponds to the state S1 in the electric generator 1 shown in FIG. 6. Considering the case of the state S1 in the electric generator 1 shown in FIG. 6, since the stator yoke 12L has the permanent magnet 15L, the magnetic flux of the permanent magnet 15L is sucked into the rotor portion 2 side so that the magnetic flux around the wound portion 17L becomes weak. On the other hand, in the electric generator 1C, since the permanent magnet 15L is not provided on the stator yoke 12CL, the magnetic flux of the permanent magnet 7L of the rotor portion 2 extends through the opposing protrusions 9, 8L and 16L$_1$, 16L$_2$ into the stator yoke 12CL side. As a result, a magnetic path M15 is formed and the magnetic flux around the wound portion 17L becomes intensive.

Similarly, in the electric generator 1, since the permanent magnet 15U is provided on the stator yoke 12U, the magnetic flux of the permanent magnet 15U forms the magnetic path M1 around the wound portion 17U on the state S1 so that the magnetic flux around the wound portion becomes intensive. On the other hand, in the electric generator 1C, since the permanent magnet 15U is not provided on the stator yoke 12CU, the magnetic flux of the permanent magnet 7U of the rotor portion 2U extends into the stator yoke 12CU side to form the magnetic path M16 but the protrusions 16U$_1$ and 16U$_2$ of the stator portion 3C are not opposed to the protrusions 8U and 9 so that the magnetic flux around the wound portion 17U becomes weak.

As described above, it can been seen that the intensity states of the magnetic flux on the wound portion 17U and 17L are reversed between the electric generators 1 and 1C. Thus, the waveform shown in FIG. 12 is reversed on the wound portions respectively between the electric generators 1 and 1C.

The invention claimed is:

1. An electric generator comprising a rotor portion and a stator portion in which:
 the rotor portion includes:
  a rotor yoke which made of soft magnetic material and which has a cylindrical non-magnetic portion and one or more pairs of grooves towards the non-magnetic portion;
  annular rotor side permanent magnets each of which is arranged in each of the grooves and magnetized as north and south poles in an axial direction; and
  a plurality of rotor side protrusions which protrude over the rotor side permanent magnet to the stator portion side and are arranged linearly with a constant pitch at mutually separated positions sandwiching the rotor side permanent magnets;
 the stator portion includes a stator member made of soft magnetic material having:
  a stator yoke;
  annular stator side permanent magnets being opposed to the rotor side permanent magnets; and
  stator side protrusions arranged linearly with the constant pitch at mutually separated positions sandwiching the stator side permanent magnets;
  wherein the stator members are arranged to shift the stator side protrusions by a half of the pitch between the neighboring stator members.

2. The electric generator according to claim 1, in which non-magnetic portions a number of which is equal to the multiple of two are provided instead of the non-magnetic portion wherein each of the non-magnetic portions extends in axial direction to connect between neighboring ones of the rotor side permanent magnets and has a length longer than the axial distance between the both end faces of the corresponding both rotor side permanent magnets.

3. An electric generator comprising a rotor portion and a stator portion in which:
 the rotor portion includes:
  a rotor yoke which made of soft magnetic material and which has a cylindrical non-magnetic portion and one or more pairs of grooves towards the non-magnetic portion;
  annular rotor side permanent magnets each of which is arranged in each of the grooves and magnetized as north and south poles in an axial direction; and
  a plurality of rotor side protrusions which protrude over the rotor side permanent magnet to the stator portion side and are arranged at mutually separated positions sandwiching the rotor side permanent magnets;

wherein one of the rotor side protrusions located between two of the rotor side permanent magnets is shift by a half of the pitch at the position where the length of the one of the rotor side protrusions in the axial direction is equally divided by two;
and in which:
the stator portion includes a stator member made of soft magnetic material having:
a stator yoke;
annular stator side permanent magnets being opposed to the rotor side permanent magnets; and
stator side protrusions arranged linearly with the constant pitch at mutually separated positions sandwiching the stator side permanent magnets.

4. The electric generator according to claim 3, in which non-magnetic portions a number of which is equal to the multiple of two are provided instead of the non-magnetic portion wherein each of the non-magnetic portions extends in axial direction to connect between neighboring ones of the rotor side permanent magnets and has a length longer than the axial distance between the both end faces of the corresponding both rotor side permanent magnets.

5. The electric generator according to claim 1, in which areas of the opposing parts of the rotor protrusions and the stator side protrusions and non-opposing part thereof are set constant respectively regardless of the positional relationship between the rotor portion and the stator portion in the rotation direction.

6. The electric generator according to claim 1, in which non-magnetic portions are provided instead of the stator side permanent magnets.

7. The electric generator according to claim 2, in which areas of the opposing parts of the rotor protrusions and the stator side protrusions and non-opposing part thereof are set constant respectively regardless of the positional relationship between the rotor portion and the stator portion in the rotation direction.

8. The electric generator according to claim 3, in which areas of the opposing parts of the rotor protrusions and the stator side protrusions and non-opposing part thereof are set constant respectively regardless of the positional relationship between the rotor portion and the stator portion in the rotation direction.

9. The electric generator according to claim 4, in which areas of the opposing parts of the rotor protrusions and the stator side protrusions and non-opposing part thereof are set constant respectively regardless of the positional relationship between the rotor portion and the stator portion in the rotation direction.

10. The electric generator according to claim 4, in which non-magnetic portions are provided instead of the stator side permanent magnets.

* * * * *